(12) United States Patent
Chiu

(10) Patent No.: US 10,229,134 B2
(45) Date of Patent: Mar. 12, 2019

(54) SYSTEMS AND METHODS FOR MANAGING UPGRADES, MIGRATION OF USER DATA AND IMPROVING PERFORMANCE OF A CLOUD-BASED PLATFORM

(71) Applicant: Box, Inc., Los Altos, CA (US)

(72) Inventor: Jeremy Chiu, Sunnyvale, CA (US)

(73) Assignee: Box, Inc., Redwood City, CA (US)

( * ) Notice: Subject to any disclaimer, the term of this patent is extended or adjusted under 35 U.S.C. 154(b) by 364 days.

(21) Appl. No.: 14/314,887

(22) Filed: Jun. 25, 2014

(65) Prior Publication Data

US 2014/0379648 A1 Dec. 25, 2014

Related U.S. Application Data

(60) Provisional application No. 61/839,325, filed on Jun. 25, 2013.

(51) Int. Cl.
*G06F 17/30* (2006.01)

(52) U.S. Cl.
CPC .. *G06F 17/30174* (2013.01); *G06F 17/30073* (2013.01)

(58) Field of Classification Search
CPC ..................... G06F 17/30174; G06F 17/30073
USPC ........................................................ 707/624
See application file for complete search history.

(56) References Cited

U.S. PATENT DOCUMENTS

| | | | |
|---|---|---|---|
| 5,799,320 A | 8/1998 | Klug | |
| 5,848,415 A | 12/1998 | Guck | |
| 5,864,870 A | 1/1999 | Guck | |
| 5,999,908 A | 12/1999 | Abelow | |
| 6,016,467 A | 1/2000 | Newsted et al. | |
| 6,034,621 A | 3/2000 | Kaufman | |
| 6,055,543 A | 4/2000 | Christensen et al. | |

(Continued)

FOREIGN PATENT DOCUMENTS

| | | |
|---|---|---|
| CA | 2724521 | 11/2009 |
| CN | 101997924 A | 3/2011 |

(Continued)

OTHER PUBLICATIONS

Exam Report for GB1317393.5 Applicant: Box, Inc. dated Nov. 7, 2014, 6 pages.

(Continued)

*Primary Examiner* — Pierre M Vital
*Assistant Examiner* — Alicia M Antoine
(74) *Attorney, Agent, or Firm* — Sheridan Ross P.C.

(57) ABSTRACT

Techniques for populating a new synchronization ("sync") folder during an upgrade of a sync client of a cloud-based platform includes transferring synced items stored at a first location to an archive location in response to an indication to upgrade the sync client, detecting an instruction to populate the new sync folder at a second location with an item, determining that the synchronization client is in migration mode and transferring a local copy of the item from the archive location to the new sync folder to populate the new sync folder at the second location when the local copy of the item has the same state as a remote copy of the item at the cloud-based platform. Also disclosed are techniques for accommodating autoupdate operations, monitoring performance of sync operations and providing a tray icon that provides a high level overview of the state of a sync operation.

27 Claims, 15 Drawing Sheets

(56) References Cited

U.S. PATENT DOCUMENTS

| | | | |
|---|---|---|---|
| 6,073,161 A | 6/2000 | DeBoskey et al. |
| 6,098,078 A | 8/2000 | Gehani et al. |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,222,078 B2 | 5/2007 | Abelow |
| 7,275,244 B1 | 9/2007 | Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,890,964 B2 | 2/2011 | Vogler-Ivashchanka et al. |
| 7,937,663 B2 | 5/2011 | Parker et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,214,747 B1 | 7/2012 | Yankovich et al. |
| 8,230,348 B2 | 7/2012 | Peters et al. |
| 8,347,276 B2 | 1/2013 | Schadow |
| 8,358,701 B2 | 1/2013 | Chou et al. |
| 8,429,540 B1 | 4/2013 | Yankovich et al. |
| 8,458,310 B1 * | 6/2013 | Mayor ............... H04L 67/34 709/203 |
| 8,464,161 B2 | 6/2013 | Giles et al. |
| 8,527,549 B2 | 9/2013 | Cidon |
| 8,549,066 B1 | 10/2013 | Donahue et al. |
| 8,549,511 B2 | 10/2013 | Seki et al. |
| 8,572,602 B1 * | 10/2013 | Colton ............... G06F 17/3089 709/220 |
| 8,607,306 B1 | 12/2013 | Bridge et al. |
| 8,738,972 B1 * | 5/2014 | Bakman ............. G06F 11/0712 714/47.1 |
| 8,849,955 B2 | 9/2014 | Prahlad et al. |
| 9,495,222 B1 * | 11/2016 | Jackson .................. G06F 9/52 |
| 2001/0027492 A1 | 10/2001 | Gupta |
| 2002/0091738 A1 | 7/2002 | Rohrabaugh et al. |
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0188667 A1 * | 12/2002 | Kirnos .............. G06F 17/30176 709/203 |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088647 A1 | 5/2004 | Miller et al. |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0028006 A1 | 2/2005 | Leser et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |

(56) References Cited

U.S. PATENT DOCUMENTS

| | | | |
|---|---|---|---|
| 2006/0238652 A1* | 10/2006 | Parker | H04L 41/22 348/564 |
| 2006/0242204 A1 | 10/2006 | Karas et al. | |
| 2006/0259524 A1 | 11/2006 | Horton | |
| 2006/0265719 A1 | 11/2006 | Astl et al. | |
| 2006/0271510 A1 | 11/2006 | Harward et al. | |
| 2007/0016680 A1 | 1/2007 | Burd et al. | |
| 2007/0038934 A1 | 2/2007 | Fellman | |
| 2007/0079242 A1 | 4/2007 | Jolley et al. | |
| 2007/0100830 A1 | 5/2007 | Beedubail et al. | |
| 2007/0115845 A1 | 5/2007 | Hochwarth et al. | |
| 2007/0118598 A1 | 5/2007 | Bedi et al. | |
| 2007/0124460 A1 | 5/2007 | McMullen et al. | |
| 2007/0124737 A1 | 5/2007 | Wensley et al. | |
| 2007/0124781 A1 | 5/2007 | Casey et al. | |
| 2007/0126635 A1 | 6/2007 | Houri | |
| 2007/0130143 A1 | 6/2007 | Zhang et al. | |
| 2007/0130163 A1 | 6/2007 | Perez et al. | |
| 2007/0198609 A1 | 8/2007 | Black et al. | |
| 2007/0208878 A1 | 9/2007 | Barnes-Leon et al. | |
| 2007/0214180 A1 | 9/2007 | Crawford | |
| 2007/0220016 A1 | 9/2007 | Estrada et al. | |
| 2007/0220590 A1 | 9/2007 | Rasmussen et al. | |
| 2007/0240057 A1 | 10/2007 | Satterfield et al. | |
| 2007/0250762 A1 | 10/2007 | Mansfield | |
| 2007/0256065 A1 | 11/2007 | Heishi et al. | |
| 2007/0266304 A1 | 11/2007 | Fletcher et al. | |
| 2007/0282848 A1 | 12/2007 | Kiilerich et al. | |
| 2007/0283443 A1 | 12/2007 | McPherson et al. | |
| 2007/0288290 A1 | 12/2007 | Motoyama et al. | |
| 2008/0005135 A1 | 1/2008 | Muthukrishnan et al. | |
| 2008/0005195 A1 | 1/2008 | Li | |
| 2008/0028323 A1 | 1/2008 | Rosen et al. | |
| 2008/0040173 A1 | 2/2008 | Aleong et al. | |
| 2008/0040503 A1 | 2/2008 | Kleks et al. | |
| 2008/0046828 A1 | 2/2008 | Bibliowicz et al. | |
| 2008/0059656 A1 | 3/2008 | Saliba et al. | |
| 2008/0063210 A1 | 3/2008 | Goodman et al. | |
| 2008/0065881 A1 | 3/2008 | Dawson et al. | |
| 2008/0077631 A1 | 3/2008 | Petri | |
| 2008/0091763 A1 | 4/2008 | Devonshire et al. | |
| 2008/0091790 A1 | 4/2008 | Beck | |
| 2008/0104277 A1 | 5/2008 | Tian | |
| 2008/0114720 A1 | 5/2008 | Smith et al. | |
| 2008/0133674 A1 | 6/2008 | Knauerhase et al. | |
| 2008/0140732 A1 | 6/2008 | Wilson et al. | |
| 2008/0147790 A1 | 6/2008 | Malaney et al. | |
| 2008/0151817 A1 | 6/2008 | Fitchett et al. | |
| 2008/0182628 A1 | 7/2008 | Lee et al. | |
| 2008/0183467 A1 | 7/2008 | Yuan et al. | |
| 2008/0184130 A1 | 7/2008 | Tien et al. | |
| 2008/0194239 A1 | 8/2008 | Hagan | |
| 2008/0215883 A1 | 9/2008 | Fok et al. | |
| 2008/0222654 A1 | 9/2008 | Xu et al. | |
| 2008/0243855 A1 | 10/2008 | Prahlad et al. | |
| 2008/0250333 A1 | 10/2008 | Reeves et al. | |
| 2008/0250348 A1 | 10/2008 | Alimpich et al. | |
| 2008/0263099 A1 | 10/2008 | Brady-Kalnay et al. | |
| 2008/0271095 A1 | 10/2008 | Shafton | |
| 2008/0276158 A1 | 11/2008 | Lim et al. | |
| 2009/0015864 A1 | 1/2009 | Hasegawa | |
| 2009/0019093 A1 | 1/2009 | Brodersen et al. | |
| 2009/0019426 A1 | 1/2009 | Baeumer et al. | |
| 2009/0030710 A1 | 1/2009 | Levine | |
| 2009/0044128 A1 | 2/2009 | Baumgarten et al. | |
| 2009/0049131 A1 | 2/2009 | Lyle et al. | |
| 2009/0119322 A1 | 5/2009 | Mills et al. | |
| 2009/0125469 A1 | 5/2009 | McDonald et al. | |
| 2009/0132651 A1 | 5/2009 | Roger et al. | |
| 2009/0138808 A1 | 5/2009 | Moromisato et al. | |
| 2009/0150417 A1 | 6/2009 | Ghods et al. | |
| 2009/0150627 A1 | 6/2009 | Benhase et al. | |
| 2009/0158142 A1 | 6/2009 | Arthursson et al. | |
| 2009/0164438 A1 | 6/2009 | Delacruz | |
| 2009/0171983 A1 | 7/2009 | Samji et al. | |
| 2009/0193107 A1 | 7/2009 | Srinivasan et al. | |
| 2009/0193345 A1 | 7/2009 | Wensley et al. | |
| 2009/0198772 A1 | 8/2009 | Kim et al. | |
| 2009/0210459 A1 | 8/2009 | Nair et al. | |
| 2009/0214115 A1 | 8/2009 | Kimura et al. | |
| 2009/0235167 A1 | 9/2009 | Boyer et al. | |
| 2009/0235181 A1 | 9/2009 | Saliba et al. | |
| 2009/0235189 A1 | 9/2009 | Aybes et al. | |
| 2009/0249224 A1 | 10/2009 | Davis et al. | |
| 2009/0254589 A1 | 10/2009 | Nair et al. | |
| 2009/0260060 A1 | 10/2009 | Smith et al. | |
| 2009/0271708 A1 | 10/2009 | Peters et al. | |
| 2009/0271779 A1* | 10/2009 | Clark | G06F 8/68 717/171 |
| 2009/0276771 A1 | 11/2009 | Nickolov et al. | |
| 2009/0282212 A1 | 11/2009 | Peterson | |
| 2009/0300356 A1 | 12/2009 | Crandell | |
| 2009/0300527 A1 | 12/2009 | Malcolm et al. | |
| 2009/0327358 A1 | 12/2009 | Lukiyanov et al. | |
| 2009/0327961 A1 | 12/2009 | De Vorchik et al. | |
| 2010/0011292 A1 | 1/2010 | Marinkovich et al. | |
| 2010/0011447 A1 | 1/2010 | Jothimani | |
| 2010/0017262 A1 | 1/2010 | Iyer et al. | |
| 2010/0036929 A1 | 2/2010 | Scherpa et al. | |
| 2010/0042720 A1 | 2/2010 | Stienhans et al. | |
| 2010/0057560 A1 | 3/2010 | Skudlark et al. | |
| 2010/0057785 A1 | 3/2010 | Khosravy et al. | |
| 2010/0076946 A1 | 3/2010 | Barker et al. | |
| 2010/0082634 A1 | 4/2010 | Leban | |
| 2010/0083136 A1 | 4/2010 | Komine et al. | |
| 2010/0088150 A1 | 4/2010 | Mazhar et al. | |
| 2010/0092126 A1 | 4/2010 | Kaliszek et al. | |
| 2010/0093310 A1 | 4/2010 | Gbadegesin et al. | |
| 2010/0107225 A1 | 4/2010 | Spencer et al. | |
| 2010/0131868 A1 | 5/2010 | Chawla et al. | |
| 2010/0151431 A1 | 6/2010 | Miller | |
| 2010/0153835 A1 | 6/2010 | Xiong et al. | |
| 2010/0162365 A1 | 6/2010 | Del Real | |
| 2010/0162374 A1 | 6/2010 | Nair | |
| 2010/0179940 A1 | 7/2010 | Gilder et al. | |
| 2010/0185463 A1 | 7/2010 | Noland et al. | |
| 2010/0185932 A1 | 7/2010 | Coffman et al. | |
| 2010/0191689 A1 | 7/2010 | Cortes et al. | |
| 2010/0198783 A1 | 8/2010 | Wang et al. | |
| 2010/0198871 A1 | 8/2010 | Stiegler et al. | |
| 2010/0198944 A1 | 8/2010 | Ho et al. | |
| 2010/0205537 A1 | 8/2010 | Knighton et al. | |
| 2010/0223378 A1 | 9/2010 | Wei | |
| 2010/0229085 A1 | 9/2010 | Nelson et al. | |
| 2010/0235526 A1 | 9/2010 | Carter et al. | |
| 2010/0235539 A1 | 9/2010 | Carter et al. | |
| 2010/0241611 A1 | 9/2010 | Zuber | |
| 2010/0241972 A1 | 9/2010 | Spataro et al. | |
| 2010/0250120 A1 | 9/2010 | Waupotitsch et al. | |
| 2010/0251240 A1* | 9/2010 | Matesan | G06F 17/30174 718/100 |
| 2010/0251340 A1 | 9/2010 | Martin et al. | |
| 2010/0257457 A1 | 10/2010 | De Goes | |
| 2010/0262582 A1 | 10/2010 | Garcia-Ascanio et al. | |
| 2010/0267588 A1 | 10/2010 | Nelson et al. | |
| 2010/0274765 A1 | 10/2010 | Murphy et al. | |
| 2010/0274772 A1 | 10/2010 | Samuels | |
| 2010/0281118 A1 | 11/2010 | Donahue et al. | |
| 2010/0290623 A1 | 11/2010 | Banks et al. | |
| 2010/0306379 A1 | 12/2010 | Ferris | |
| 2010/0322252 A1 | 12/2010 | Suganthi et al. | |
| 2010/0325155 A1 | 12/2010 | Skinner et al. | |
| 2010/0325527 A1 | 12/2010 | Estrada et al. | |
| 2010/0325559 A1 | 12/2010 | Westerinen et al. | |
| 2010/0325655 A1 | 12/2010 | Perez | |
| 2010/0332401 A1 | 12/2010 | Prahlad et al. | |
| 2010/0332962 A1 | 12/2010 | Hammer et al. | |
| 2010/0333116 A1 | 12/2010 | Prahlad et al. | |
| 2011/0001763 A1 | 1/2011 | Murakami | |
| 2011/0016409 A1 | 1/2011 | Grosz et al. | |
| 2011/0022559 A1 | 1/2011 | Andersen et al. | |
| 2011/0022812 A1 | 1/2011 | van der Linden et al. | |
| 2011/0029883 A1 | 2/2011 | Lussier et al. | |
| 2011/0040812 A1 | 2/2011 | Phillips | |

(56) References Cited

U.S. PATENT DOCUMENTS

| | | |
|---|---|---|
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0113320 A1 | 5/2011 | Neff et al. |
| 2011/0119313 A1 | 5/2011 | Sung et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0084261 A1* | 4/2012 | Parab ............... G06F 17/30156 707/654 |
| 2012/0089659 A1 | 4/2012 | Halevi et al. |
| 2012/0110005 A1 | 5/2012 | Kuo et al. |
| 2012/0110436 A1 | 5/2012 | Adler, III et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0166516 A1* | 6/2012 | Simmons ........... G06F 17/30233 709/202 |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0216112 A1* | 8/2012 | McInerney ....... G06F 17/30067 715/255 |
| 2012/0218885 A1 | 8/2012 | Abel et al. |
| 2012/0221789 A1 | 8/2012 | Felter |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0240061 A1 | 9/2012 | Hillenius et al. |
| 2012/0257249 A1 | 10/2012 | Natarajan |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0073403 A1 | 3/2013 | Tuchman et al. |
| 2013/0080919 A1 | 3/2013 | Kiang et al. |
| 2013/0117337 A1 | 5/2013 | Dunham |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0226876 A1* | 8/2013 | Gati ................. G06F 17/30079 707/652 |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0305039 A1 | 11/2013 | Gauda |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |
| 2014/0095432 A1* | 4/2014 | Trumbull ................ G06F 17/30 707/610 |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0237464 A1* | 8/2014 | Waterman .............. G06F 8/65 717/172 |

(56) References Cited

U.S. PATENT DOCUMENTS

| | | | | |
|---|---|---|---|---|
| 2014/0250067 | A1* | 9/2014 | Calkowski | G06F 17/30174 707/624 |
| 2014/0304694 | A1* | 10/2014 | Huff, II | G06F 8/658 717/168 |

FOREIGN PATENT DOCUMENTS

| | | |
|---|---|---|
| CN | 102264063 A | 11/2011 |
| EP | 0921661 A2 | 6/1999 |
| EP | 1349088 | 10/2003 |
| EP | 1528746 A2 | 5/2005 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-2002019128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 | 11/2013 |

OTHER PUBLICATIONS

Exam Report for GB1311417.8 Applicant: Box, Inc. dated Nov. 7, 2014, 2 pages.
Exam Report for GB1311421.0 Applicant: Box, Inc. dated Nov. 7, 2014, 4 pages.
Exam Report for GB1316682.2 Applicant: Box, Inc. dated Nov. 19, 2014, 6 pages.
Exam Report for GB1312095.1 Applicant: Box, Inc. dated Nov. 19, 2014, 5 pages.
Exam Report for GB1313559.5 Applicant: Box, Inc. dated Nov. 4, 2014, 2 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
Exam Report for GB1410569.6 Applicant: Box, Inc. dated Jul. 11, 2014, 9 pages.
Extended Search Report for EP131832800, Applicant: Box, Inc. dated Aug. 25, 2014, 7 pages.
Extended Search Report for EP141509422, Applicant: Box, Inc. dated Aug. 26, 2014, 12pages.
Search Report for EP 13189144.2 Applicant: Box, Inc. dated Sep. 1, 2014, 9 pages.
Exam Report for GB1312874.9 Applicant: Box, Inc. dated Sep. 26, 2014, 2 pages.
Exam Report for GB1415126.0 Applicant: Box, Inc. dated Oct. 2, 2014, 8 pages.
Exam Report for GB1415314.2 Applicant: Box, Inc. dated Oct. 7, 2014, 6 pages.
Exam Report for GB1309209.3 Applicant: Box, Inc. dated Oct. 7, 2014, 3 pages.
Exam Report for GB1315232.7 Applicant: Box, Inc. dated Oct. 9, 2014, 5 pages.
Exam Report for GB1318789.3 Applicant: Box, Inc. dated Oct. 30, 2014, 6 pages.
Microsoft Windows XP Professional Product Documentation: How Inheritance Affects File and Folder Permissions, Apr. 11, 2014, 2 pages.
Sommerer, "Presentable Document Format: Improved On-demand PDF to HTML Conversion," retrieved from the internet, http://research.microsoft.com, Nov. 2004, 8 pages.
"Average Conversion Time for a D60 RAW file?" http://www.dpreview.com, Jul. 22, 2002, 4 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web. Archive.org/web, 3 pages.
"Tulsa TechFest 2012—Agenda," retrieved from the website, http://web.archive.org, Oct. 2, 2012, 2 pages.
"Understanding Metadata," National Information Standards Organization, NISO Press, 2004, 20 pages.
Burns, "Developing Secure Mobile Applications for Android," Oct. 2008, Version 1.0, 1-28 pages.
Cisco, "FTP Load Balancing on ACE in Routed Mode Configuration Example," DocWiki, Jun. 2011, 7 pages.
Cohen, "Debating the Definition of Cloud Computing Platforms," retrieved from the internet, http://forbes.com, Feb. 3, 2014, 7 pages.
Comes, "MediaXchange User's Manual," Version 1.15.15, Feb. 1, 2009, pp. 1-90.
Conner, "Google Apps: The Missing Manual," published by O'Reilly Media, May 27, 2008, 24 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13158415.3, Applicant: Box, Inc. dated Jun. 4, 2013, 8 pages.
Exam Report for EP13168784.0, Applicant: Box, Inc. dated Nov. 21, 2013, 7 pages.
Exam Report for EP13177108.1, Applicant: Box, Inc. dated May 26, 2014, 6 pages.
Exam Report for EP13185269.1, Applicant: Box, Inc. dated Jan. 28, 7 pages.
Exam Report for GB1300188.8, Applicant: Box, Inc. dated May 31, 2013, 8 pages.

(56) References Cited

OTHER PUBLICATIONS

Exam Report for GB1306011.6, Applicant: Box, Inc. dated Apr. 18, 2013, 8 pages.
Exam Report for GB1308842.2, Applicant: Box, Inc. dated Mar. 10, 2014, 4 pages.
Exam Report for GB1309209.3, Applicant: Box, Inc. dated Oct. 30, 2013, 11 pages.
Exam Report for GB1312095.1, Applicant: Box, Inc. dated Dec. 12, 2013, 7 pages.
Exam Report for GB1312264.3, Applicant: Box, Inc. dated Mar. 24, 2014, 7 pages.
Exam Report for GB1312874.9, Applicant: Box, Inc. dated Dec. 20, 2013, 11 pages.
Exam Report for GB1313559.5, Applicant: Box, Inc., dated Aug. 22, 2013, 19 pages.
Exam Report for GB1314771.5, Applicant: Box, Inc. dated Feb. 17, 2014, 7 pages.
Exam Report for GB1316532.9, Applicant: Box, Inc. dated Oct. 31, 2013, 10 pages.
Exam Report for GB1316533.7, Applicant: Box, Inc. dated Oct. 8, 2013, 9 pages.
Exam Report for GB1316971.9, Applicant: Box, Inc. dated Nov. 26, 2013, 10 pages.
Exam Report for GB1317600.3, Applicant: Box, Inc. dated Nov. 21, 2013, 8 pages.
Exam Report for GB1318373.6, Applicant: Box, Inc. dated Dec. 17, 2013, 4 pages.
Exam Report for GB1318792.7, Applicant: Box, Inc. dated May 22, 2014, 2 pages.
Exam Report for GB1320902.8, Applicant: Box, Inc. dated Dec. 20, 2013, 6 pages.
Gedymin, "Cloud computing with an emphasis on Google App Engine," Master Final Project, Sep. 2011, 146 pages.
Google Docs, http://web. Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/039126 dated Oct. 6, 2011, pp. 1-13.
International Search Report and Written Opinion for PCT/US2011/041308 dated Jul. 2, 2012, pp. 1-16.
International Search Report and Written Opinion for PCT/US2011/047530, Applicant: Box, Inc., dated Mar. 22, 2013, pp. 1-10.
International Search Report and Written Opinion for PCT/US2011/056472 dated Jun. 22, 2012, pp. 1-12.
International Search Report and Written Opinion for PCT/US2011/057938, Applicant: Box, Inc., dated Mar. 29, 2013, 10 pages.
International Search Report and Written Opinion for PCT/US2011/060875 dated Oct. 30, 2012, pp. 1-10.
International Search Report and Written Opinion for PCT/US2012/056955, Applicant: Box, Inc., dated Mar. 27, 2013, pp. 1-11.
International Search Report and Written Opinion for PCT/US2012/063041, Applicant: Box, Inc., dated Mar. 29, 2013, 12 pages.
International Search Report and Written Opinion for PCT/US2012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
International Search Report and Written Opinion for PCT/US2012/070366, Applicant: Box, Inc., dated Apr. 24, 2013, 10 pages.
International Search Report and Written Opinion for PCT/US2013/020267, Applicant: Box, Inc., dated May 7, 2013, 10 pages.
International Search Report and Written Opinion for PCT/US2013/023889, Applicant: Box, Inc., dated Jun. 24, 2013, 13 pages.
International Search Report and Written Opinion for PCT/US2013/029520, Applicant: Box, Inc., dated Jun. 26, 2013, 10 pages.
International Search Report and Written Opinion for PCT/US2013/034765, Applicant: Box, Inc., dated Jan. 20, 2014, 15 pages.
International Search Report and Written Opinion for PCT/US2013/035404, Applicant: Box, Inc., dated Jun. 26, 2013, 11 pages.
International Search Report and Written Opinion for PCT/US2013/039782, Applicant: Box, Inc., dated Aug. 28, 2013, 15 pages.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Partial Search Report for EP131832800, Applicant: Box, Inc. dated May 8, 2014, 5 pages.
Patent Court Document of Approved Judgment for GB0602349.3 and GB0623571.7; Mar. 3, 2009, 17 pages.
Pyle et al. "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP 11729851.3, Applicant: Box, Inc. dated Feb. 7, 2014, 9 pages.
Search Report for EP13187217.8, Applicant: Box, Inc. dated Apr. 15, 2014, 12 pages.
Search Report for EP141509422, Applicant: Box, Inc. dated May 8, 2014, 7 pages.
Search Report for EP14151588.2, Applicant: Box, Inc. dated Apr. 15, 2014, 12 pages.
Search Report for EP14153783.7, Applicant: Box, Inc. dated Mar. 24, 2014, 7 pages.
Sommerer, "Presentable Document Format: Improved On-demand PDF to HTML Conversion," retrieved from the internet, http://research.microsoft.com, 8 pages.
Supplementary European Search Report European Application No. EP 08 85 8563 dated Jun. 20, 2011 pp. 1-5.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.

\* cited by examiner

SYSTEMS AND METHODS FOR MANAGING UPGRADES, MIGRATION OF USER DATA AND IMPROVING PERFORMANCE OF A CLOUD-BASED PLATFORM

CROSS-REFERENCE TO RELATED APPLICATIONS

This application claims priority to and benefit from U.S. Provisional Patent Application Ser. No. 61/839,325 titled "SYSTEMS AND METHODS FOR IMPROVING PERFORMANCE OF A CLOUD-BASED PLATFORM" filed on Jun. 25, 2013, which is incorporated by reference in its entirety herein.

BACKGROUND

Programs installed on a device (e.g., desktop computer, laptop computer, mobile device, etc.) can be updated or upgraded from time to time. Generally, a software or program upgrade replaces an old version of a software or program with a major version of a software or program. A software or program update, on the other hand, is for updating a major version of a software program. A software update does not upgrade the software program to the next major version. Software updates are also known as patches and are released for fixing bugs, enhancing stability, security, compatibility or the like.

BRIEF DESCRIPTION OF THE DRAWINGS

The present embodiments are illustrated by way of example and are not intended to be limited by the figures of the accompanying drawings.

The same reference numbers and any acronyms identify elements or acts with the same or similar structure or functionality throughout the drawings and specification for ease of understanding and convenience.

DETAILED DESCRIPTION

Figure 1:
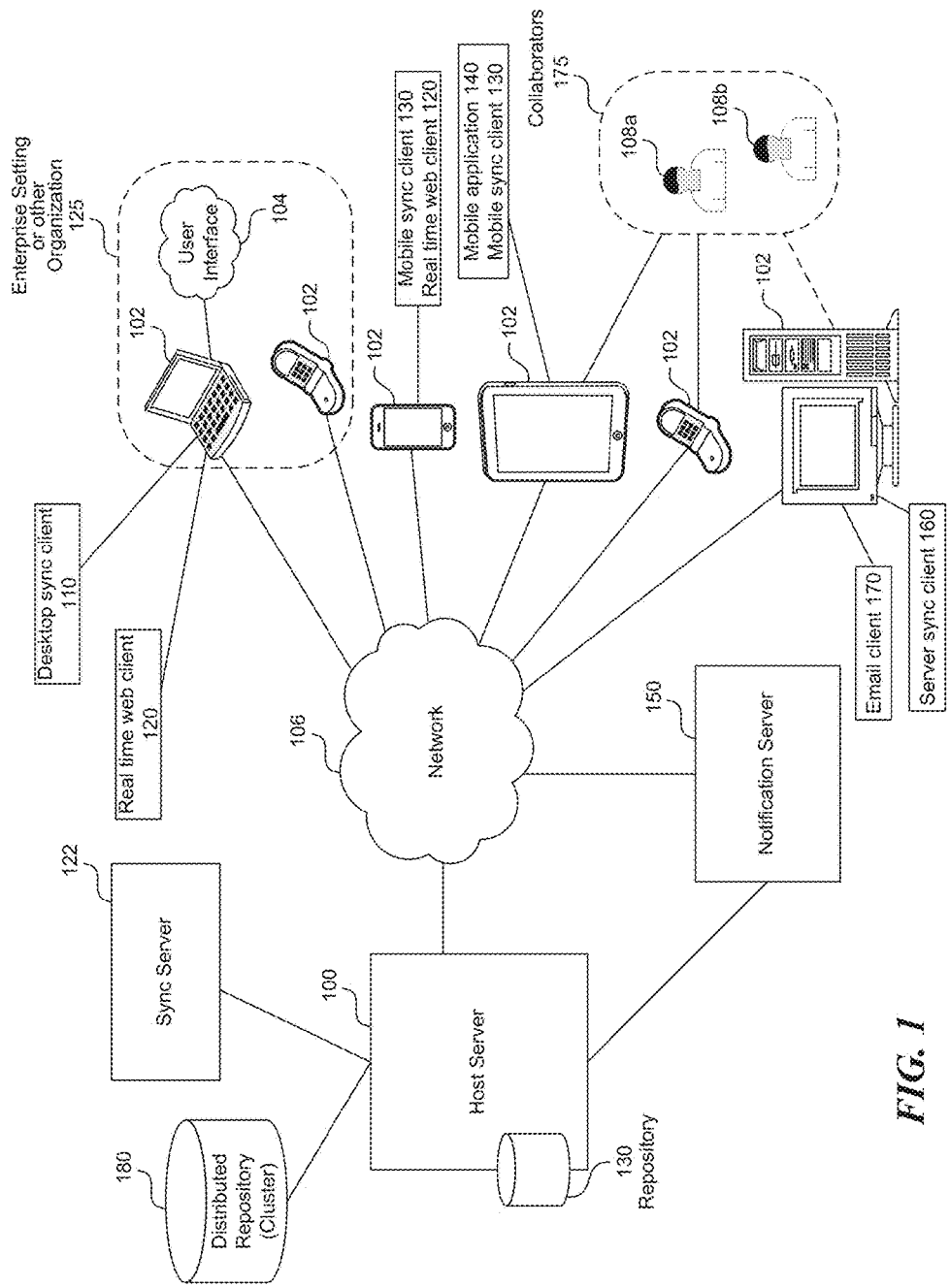
FIG. 1 depicts an example diagram of a cloud-based service, collaboration and/or cloud storage platform ("cloud-based platform") having a synchronization client ("sync client" or "sync application") capable of managing upgrades, migration of user data and improving performance.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1 illustrates an example diagram of a cloud-based service, collaboration and/or cloud storage platform ("cloud-based platform") having a synchronization ("sync") client capable of managing upgrades, migration of user data and improving performance.

As shown in FIG. 1, a host server 100 of a cloud-based platform can send changes or updates to remote synchronization clients (or sync clients) (e.g., clients 110, 120, 130, 140, 160, 170) at devices 102 with events that occurred via the platform hosted by the server 100. Similarly, sync clients at devices 102 can send sync events to the cloud-based platform for execution on the remote file system maintained server side.

The client devices 102 can be any system and/or device, and/or any combination of devices/systems that is able to establish a communication or a connection, including wired, wireless, cellular connections with another device, a server and/or other systems such as host server 100 and/or a notification server 150. Client devices 102 typically include a display and/or other output functionalities to present information and data exchanged between among the devices 102, the notification server 150, and/or the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), mobile-enabled powered watch (e.g., iOS, Android or other platform based), Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, host server 100, and/or the notification server 150 (e.g., a server hosting application 120) are coupled via a network 106. In some embodiments, the devices 102 and host server 100 and/or notification server 150 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used by various users or collaborators (e.g., collaborators 108) for accessing, through network 106, a web-based collaboration environment or online collaboration platform (e.g., hosted by the host server 100). The collaboration environment or platform can have one or more collective settings 125 for an enterprise or an organization that the users belong, and can provide an user interface 104 for the users to access such platform under the settings 125.

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., PowerPoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a workspace and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a workspace for other users to access (e.g., for viewing, editing, commenting, signing-off, or otherwise manipulating). The user can login to the online platform and upload the document (or any other type of work item) to an existing workspace or to a new workspace. The document can be shared with existing users or collaborators in a workspace.

In general, network 106, over which the client devices 102 and the host server 100 communicate may be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 2:
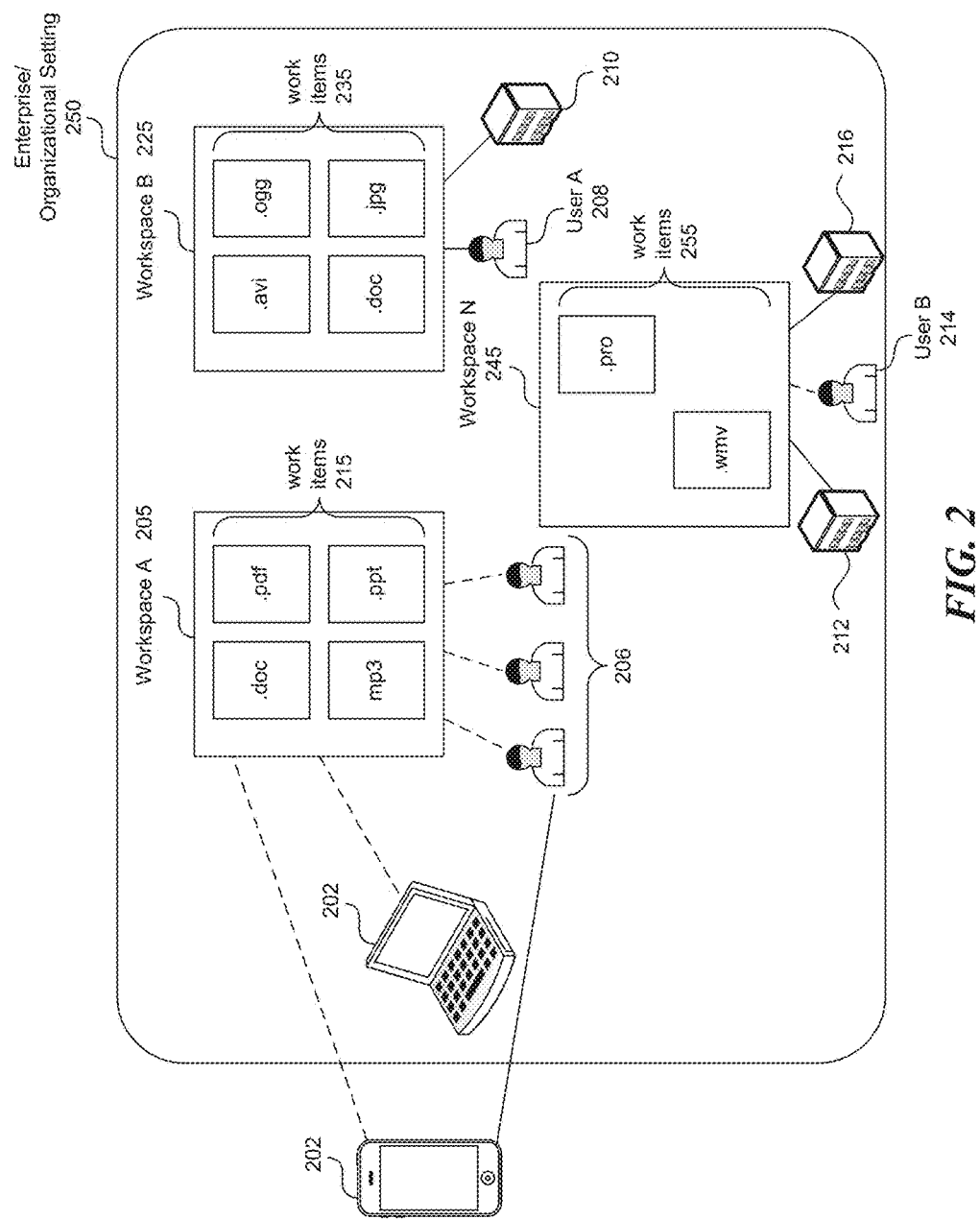
FIG. 2 depicts an example diagram of a web-based or online collaboration platform deployed in an enterprise or other organizational setting for organizing work items and workspaces.

A diagrammatic illustration of the cloud-based environment (e.g., collaboration environment) and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3A.

In general, multiple users collaborate in the cloud-based environment hosted by server 100, and the user devices 102 of these users need to be appropriately updated such that the most current versions of data/content are synchronized with the relevant user devices and that notification of events are sent to the relevant devices/users in a timely and orderly fashion. Any given user can utilize any number and types of clients (e.g., synchronization client, real time web client, mobile synchronization client, mobile application, email client, server synchronization client, etc.) at any given time. Thus, the host server 100 and the remote synchronization clients 110-170 described herein together can implement the disclosed techniques in facilitating the orderly synchronizing or updating of the remote clients 110-170 which a given user/collaborator may use to access the cloud platform via any number of user devices 102.

In general, when a user action takes place, the user action is processed to become a plurality of event entries each corresponding to a collaborator 175, and each event entry can be read by a remote client of the collaborator to reflect the user action.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, workspace A 205 can be associated with work items 215, workspace B 225 can be associated with work items 235, and workspace N can be associated with work items 255. The work items 215, 235, and 255 can be unique to each workspace but need not be. For example, a particular word document can be associated with only one workspace (e.g., workspace A 205) or it can be associated with multiple workspaces (e.g., Workspace A 205 and workspace B 225, etc.).

In general, each workspace has a set of users or collaborators associated with it. For example, workspace A 205 is associated with multiple users or collaborators 206. In some instances, workspaces deployed in an enterprise can be department specific. For example, workspace B can be associated with department 210 and some users shown as example user A 208 and workspace N 245 can be associated with departments 212 and 216 and users shown as example user B 214.

Each user associated with a workspace can generally access the work items associated with the workspace. The level of access depends on permissions associated with the specific workspace, and/or with a specific work item. Permissions can be set for the workspace or set individually on a per work item basis. For example, the creator of a workspace (e.g., one of user A 208 who creates workspace B) can set one permission setting applicable to all work items 235 for other associated users and/or users associated with the affiliate department 210, for example. Creator user A 208 can also set different permission settings for each work item, which can be the same for different users, or varying for different users.

In each workspace A, B . . . N, when an action is performed on a work item by a given user or any other activity is detected in the workspace, other users in the same workspace can be notified (e.g., in real time or in near real time, or not in real time). Activities which trigger real time notifications can include, by way of example but not limitation, adding, deleting, or modifying collaborators in the workspace, uploading, downloading, adding, deleting a work item in the workspace, creating a discussion topic in the workspace.

In some embodiments, items or content downloaded or edited can cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 can be in the same workspace A 205 or the user can include a newly invited collaborator. Similarly, in the same user interface where discussion topics can be created in a workspace (e.g., workspace A, B or N, etc.), actionable events on work items can be created and/or delegated/assigned to other users such as collaborators of a given workspace 206 or other users. Through the same user interface, task status and updates from multiple users or collaborators can be indicated and reflected. In some instances, the users can perform the tasks (e.g., review or approve or reject, etc.) via the same user interface.

Figure 3A:
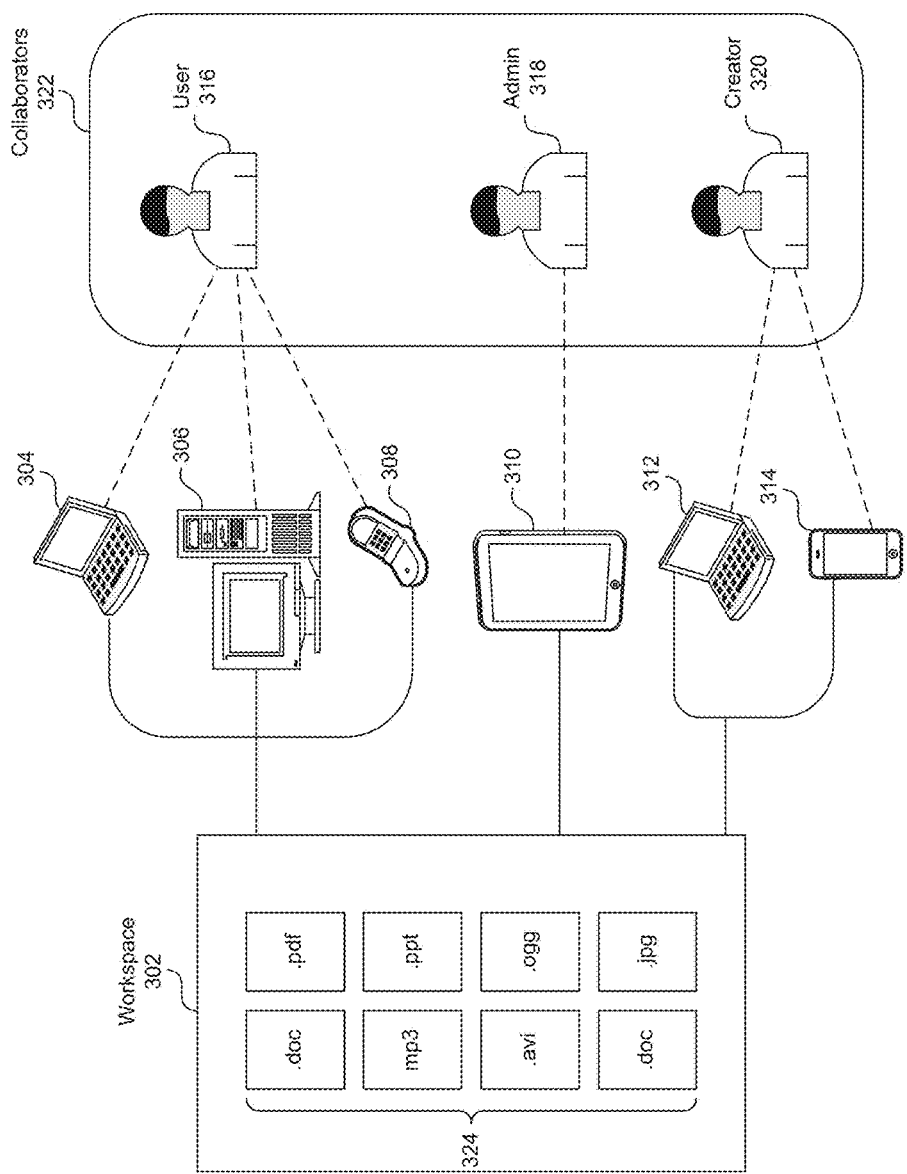
FIG. 3A depicts an example diagram of a workspace in a cloud-based platform such as an online or web-based collaboration environment accessible by multiple collaborators through various devices.

FIG. 3A depicts an example diagram of a workspace 302 in an online or web-based collaboration environment accessible by multiple collaborators 322 through various devices.

Each of users 316, 318, and 320 can individually use multiple different devices to access and/or manipulate work items 324 in the workspace 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302. Users can also be notified of access, edit, modification, and/or upload related-actions performed on work items 324 by other users or any other types of activities detected in the workspace 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same workspace), either in the same workspace 302 or in some other workspace. The actionable events such as tasks can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant workspaces, in the same user interface.

Figure 3B:
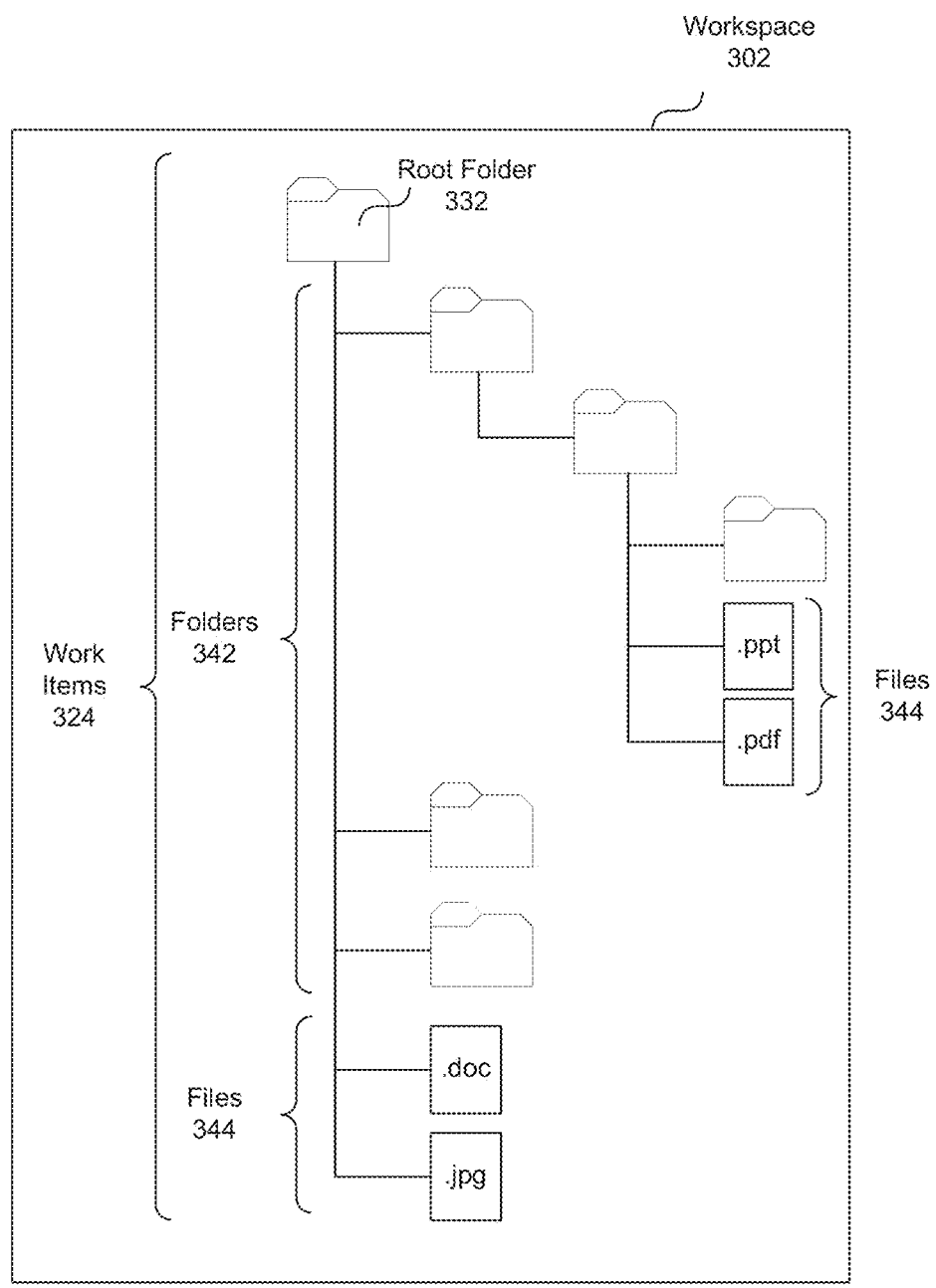
FIG. 3B depicts an abstract diagram illustrating an example data structure of the folders and files in the workspace of FIG. 3A.

FIG. 3B depicts an abstract diagram illustrating an example data structure of the folders and files in the workspace 302 of FIG. 3A. As illustrated in FIG. 3B, work items 324 of FIG. 3A can be further organized into groups using one or more folders 342 within workspace 302. The folders 342 can have more than one levels of hierarchy including, for example, parent/ascendant folder(s), child/descendant folder(s) or subfolder(s), and/or sibling folder(s). A person having ordinary skill in the art will understand that terminologies describing the hierarchy of the folders are used in a relative sense. For example, a parent folder can be a child folder of a grandparent folder, a particular child folder can be a parent folder of a grandchild folder, and so on. It is noted that the illustration of the folders are merely exemplary; depending on the embodiments, there can be more than one level of hierarchy between the illustrated folders.

Further, in some of the present embodiments, the synchronization state of a folder can be: (i) synchronized, (ii) partially synchronized, or (iii) unsynchronized. For purposes of discussion herein, a folder is synchronized when all items (e.g., folders and files) under the folder are synchronized. Likewise, a folder is unsynchronized when all items (e.g., folders and files) under the folder are unsynchronized. A folder is partially synchronized when it is neither synchronized nor unsynchronized.

Various Migration Considerations

Different versions of a target application, program, module or component can have different autoupgrade mechanisms. For example, an older version of a sync client (e.g., Sync 3.x) can have a different autoupgrade mechanism than a newer version of the sync client (e.g., Sync 4.x). Embodiments of the disclosure can bridge different versions of sync clients during an upgrade to ease the transition for users and to ensure maximum adoption of newer version of the sync client (or new sync client).

Autoupgrade

In some embodiments, users of the old sync client need not actively download anything to upgrade to the new sync client. The users of the old sync client can be presented with a normal upgrade UI that the old sync client usually presents. Some embodiments of the present disclosure can migrate only the last active user if multiple accounts are not supported (or all active users in some instances). Some embodiments do not delete any user data for any account off of the client device. Some embodiments can move the last logged in user's sync folder to the new sync folder of the new sync client unless the user has selected a non-default sync location in the old sync client. If they have selected a non-default sync folder then the system can use the non-default sync location as the new sync folder location for the new sync client. Some embodiments can also clean up any old sync client application data from the machine.

Direct Install

A direct install, where the user actively runs an msi (i.e., a Windows installer) or uses the Mac installer script, can behave the same way as an autoupgrade in some embodiments. Some embodiments can migrate the last active user, move their old sync folder and clean up any old sync client application data from the client device.

Some embodiments can hook into the old sync client's upgrade mechanism on both Mac and Windows. Some embodiments can package the new sync client install so that the old sync client upgrade mechanism will run it as if it were an upgrade to old sync client. Both Windows and Mac Sync use Sparkle (or NetSparkle) to manage autoupgrade. So in both cases, some embodiments can modify the Sparkle rss feed to publish the new sync client upgrade. In both cases, some embodiments can have some extra code to parse out the last logged in username and sync-point from a .yaml file that the old sync client keeps. This information can be passed to the new sync client in some embodiments. In both cases there can be some extra code to clean up application data left behind by the old sync client.

Migrating User's Data

As described above, since some program modules or components can be upgraded to a new version that is significantly different from the old version and since the old and new sync clients can sync to different default locations, embodiments of the present disclosure provide a solution to initially populate the new sync folder with data. Some embodiments can fill the synchronization folder with data from the remote cloud-based platform. This may mean that local changes made since their last sync will not be reflected in the new sync folder.

Embodiments of the present disclosure can accommodate Sync-point Backup which can deal with situations where the local folder selected for sync does not match the expected inode (or index node which is a data structure used to represent a file system object) or the last logged-in user does not match the current user. This Sync-point Backup can have the same functionality required for migration of user data in some embodiments. It can rename the existing selected local sync folder by appending a known suffix like "_archive" to the name. Then it can pull down the synced files from remote cloud-based system to the sync folder in some embodiments. To save disk space and speed up the process, if a file is identified as to-be-synced and it exists locally in the old sync point and the file hashes match then the system can move the file from the old location to the new location in the new sync folder.

This Sync-point Backup functionality can be used in several situations. For example, the Sync-point Backup functionality can be used when migrating from an old sync client to a new sync client, during uninstall-reinstall, during change of active user, or the like. In some embodiments, a single implementation of the Sync-point Backup functionality can handle all these cases.

In some embodiments, everything necessary for migration of user data needs to be either in the .msi or in the new sync client itself because the system needs to support autoupgrade as well as direct install upgrade. In the direct install case, the system may not have any involvement from old sync client.

Example Implementation for WINDOWS Platform

Figure 4:
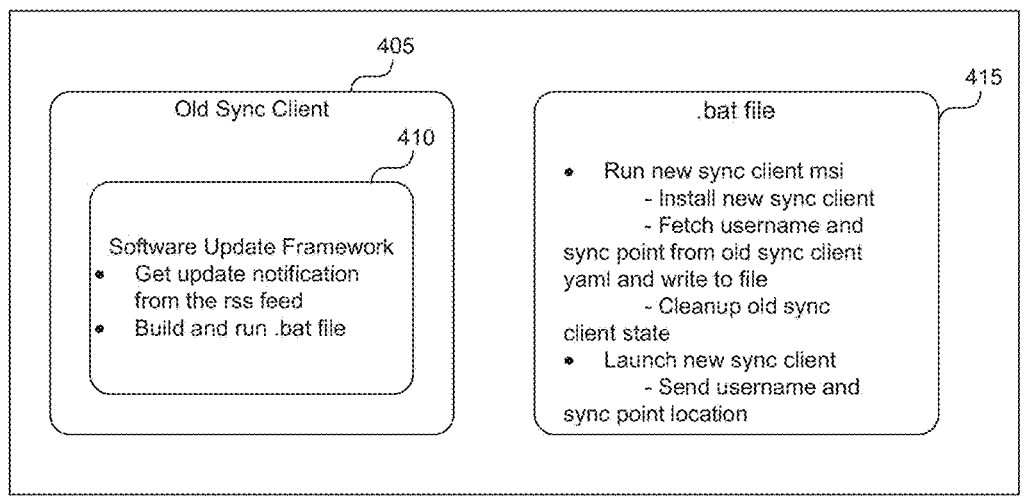
FIG. 4 depicts an example block diagram showing an example autoupgrade embodiment for WINDOWS platform for upgrading a synchronization client of a cloud-based platform.

FIG. 4 depicts an example block diagram showing an example autoupgrade embodiment for Windows platform for upgrading a synchronization client of a cloud-based platform.

Autoupgrade for Windows sync client can work by first publishing a new .msi to a software update framework (e.g., NetSparkle). The software update framework downloads this .msi and once the .msi is local, the software update framework generates and runs a .bat file (batch file) which will run the installer and re-launch the sync client.

To get a new sync client installed, some embodiments publish the new sync client .msi via the software update framework rss feed. The new sync client can use the same .msi product code as the old sync client so the new sync client .msi will be treated as an upgrade in some embodiments. The new sync client can be installed and everything that the old sync client .msi installed can be removed.

To launch the new sync client correctly, some embodiments modify the code that generates the .bat file. Some embodiments change the generated .bat 415 to run the new sync client application rather than the old sync client. One way to do this would be to introduce a new delegate in charge of building the correct .bat file. The old sync client 405 code could own this delegate rather than the software update framework code.

Some embodiments need to enhance the new sync client .msi to detect old sync client files so that the last logged-in username and sync-point can be mined or extracted. Some embodiments pass this information to the new sync client via a file that the new sync client knows to look for first when it is first-run.

Some embodiments can clean up old sync client application data, typically after a successful installation of the new sync client. That way if installation of the new sync client fails, a viable old sync client install with appropriate data will remain in place. Some embodiments can build cleanup as a separate executable file or a script that can be configured to remove some or all of the following in some embodiments:

Sync and desktop folders from AppData/Roaming.
Old sync client logs from AppData/Local
Any registry keys under HKLM\SOFTWARE\

Example Implementation for MAC Platform

Figure 5:
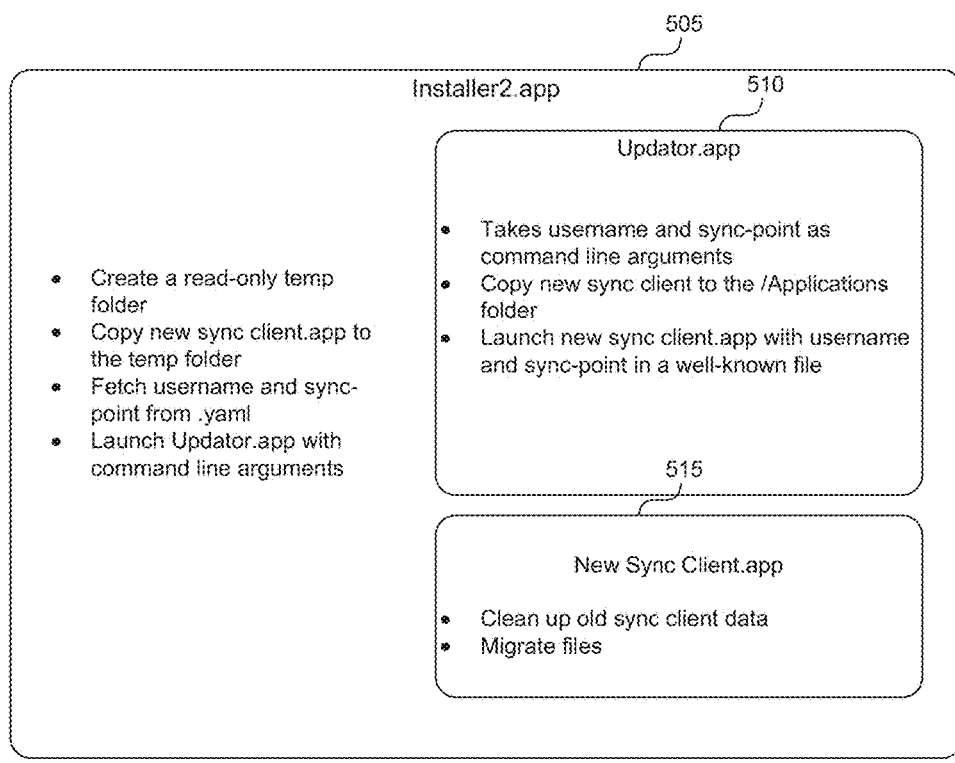
FIG. 5 depicts an example block diagram showing an example autoupgrade embodiment for MAC platform for upgrading a synchronization client of a cloud-based platform.

FIG. 5 depicts an example block diagram showing an example autoupgrade embodiment for MAC platform for upgrading a synchronization client of a cloud-based platform.

Autoupgrade for MAC sync client starts by publishing a new .zip containing a .app ("installer.app") on the software update framework rss feed. The software update framework unzips the .zip and runs the installer.app contained inside. The installer.app is an installer containing an updated preference pane. The installer.app copies that new preference pane into the right location.

Some embodiments can leverage the software update framework's running of the installer.app in the .zip to upgrade to the new sync client and perform arbitrary pre and post operations. Some embodiments include a new installer ("installer2.app" 505) and package that in the .zip that is published. The installer2.app 505 can contain the new sync client app package 515. Some embodiments use the installer2.app to grab the username and sync-point from the old sync client .yaml file, install the new sync client, and launch the new sync client with the appropriate command line arguments.

To actually install the new sync client, some embodiments can use a utility taken from new sync client autoupgrade Updater.app 510. The Updater.app is what the new sync client can use to install and launch new versions of the new sync client. In some embodiments, the Updater.app takes a path to a read-only temp folder containing the new sync.app and copies the new sync.app to "Applications" directory/folder. It then launches the newly installed new sync.app. The installer2.app can have the new sync.app bundled and can copy it out to a read-only temp location for the updater.app's consumption.

Because there may not be any kind of installer in the direct install case, the sync app itself will necessarily be responsible for finding the necessary old sync client .yaml data file, parsing it, and cleaning up any old sync client data or state in some embodiments. The items depicted in FIG. 5 can all be compressed into a .zip in some embodiments.

Sync Client Enhancements

Some embodiments leverage the existing first-run check which is currently used to clear and reset the "favorites" sidebar on MAC platforms. On first run, the system can look for and parse a upgrade file which will contain the last logged-in username and sync-point. Some embodiments will populate preferences with that information and run the Sync-point Backup functionality. If the current sync-point is the default old sync-point some embodiments will handle that as a special case. In that case the system can move the old sync-point folder to the default new sync client folder path and change the preferences to point at that path before running Sync-point Backup.

In the Sync-point Backup functionality some embodiments hit the case where the username matches the expected username but the inode of the sync-point does not match expected (because the last used inode will always be null on first run). This will cause the system to rename the current sync-point as a backup, create a new sync-point with the same name, and fill the new folder with content that matches content from the remote cloud-based system. To speed things up some embodiments will move any matching content from the local backup to the new sync-point.

In some embodiments, there is some additional information left behind by old sync client such as a file that contains hashes and timestamps from the last scan that the old sync client did. Some embodiments use this file to optimize the migration. Some embodiments save on some hash calculations by using this file.

In some embodiments the Sync-point Backup functionality will own the data migration. This functionality can be used for migration, uninstall/reinstall, and switching between user accounts. In some embodiments, if the login username matches the last-logged-in username then the system will use move to transfer the data otherwise the system will use copy. In some embodiments, if there is already a sync folder the system can move it aside, rename it to "Sync (backup)", and create a new "Sync" folder.

Some embodiments contemplate an optimization which would speed up file migration by using some data left by the old sync client. Using this data can make things faster but it can also make the new sync client code 'dirtier' by adding the old sync client specific knowledge into the new sync client codebase.

User File Migration

As described above, a sync client is a local counterpart to a cloud-based platform (e.g., cloud-based collaboration and/or storage platform) and can include a folder containing synchronized file objects ("sync folder"). To optimize the population of the sync folder (e.g., when a user performs an upgrade of a sync client), the present disclosure provides various embodiments to manage and optimize user file migration. Some embodiments can pull data from the user's old local sync files instead of actually pulling data from the cloud-based platform or system whenever possible. By pulling data from local sync files, some embodiments can reduce the time to populate the sync folder and consume little or no bandwidth while performing the migration. As a result, CPU and network resources can be conserved, which can lead to overall improvement in the performance of sync clients in executing sync operations.

Embodiments of the present disclosure provides many advantages. For example, some embodiments can speed up the initial population of the new sync folder. Some embodiments can leave any problem files in an easy to access location in such a way that the user can go and manually migrate and/or resolve any issues.

Some embodiments can pull data from the old local sync files by ensuring that the end state of the sync folder mirrors the user's content on the remote cloud-based system. In some embodiments the remote cloud-based system can be the source of truth for initially populating the sync folder. In some embodiments, no user data may be destroyed. All data is either migrated to the new sync folder or re-located to an archive location that is easily accessible. In some embodiments, any data that can reasonably be obtained from a disk rather than downloading from the remote cloud-based system is retrieved from the disk. In some embodiments, any errors encountered during the migration (e.g., crashes, conflicts, etc.) can be handled robustly in the same way that the synchronization client generally handles such errors.

Some embodiments leave an archive of the user's old sync folder with any problem items. Problem items can remain in the same relative location they were in the original sync folder. In other words, the archive sync folder in some embodiments is a skeleton of the original sync folder, containing problem items and any directories along the path to those problem items.

Some embodiments can leverage the sync client as much as possible rather than replicating the sync client's existing download for the special case of initial folder population. For example, the system can sync a local folder which is empty with the user's sync folder and download from the remote cloud-based system to a local folder which is empty.

In some embodiments, initially, before beginning the modified sync can occur, the system can move all of the user's data aside to an archive location (e.g., <foldername_archive> location). This can let the sync client start with a new clean sync folder. In some embodiments, the location in code that is modified is the actual fetching of the data from the remote cloud-based system before the system creates the new item locally. The rest of the sync execution can remain the same in some embodiments. All the conflict handling, error handling, etc. from the normal sync operations can be leveraged.

In some embodiments, the sync_event_executor component that executes sync events can be modified so that a create command moves an existing local item rather than downloading it. Certain embodiments can detect create commands for items from the remote cloud-based system (e.g., server providing cloud-based services such as collaborative and/or file sharing services). If the sync client is in migration mode, the file migration system can obtain a hash (e.g., sha1, md5 or other suitable hashing algorithm) for the file from the remote cloud-based system shadow and compare that against the sha1 for the local file. If they match then the system can move the file from the old location (e.g., archive location) to the new location in the new sync folder. In some embodiments the system can return the path to the old on-disk location and perform the move. If the hashes do not match or if there is no file locally then the system can perform a download of the file from the remote cloud-based system.

Some embodiments can detect and set the migration mode flag by leveraging the existing first-run mode and looking for old files (i.e., files from the old version of the sync client) or via command line argument.

In some embodiments, the system will have the remote cloud-based system sha1 for the file because the sync client will have already run a get account tree (GAT) method as an initial full scan against the remote cloud-based system. That GAT will have populated the remote cloud-based system File System Shadow with sha1 information. In some embodiments, the sync client would not be getting a create event for the file unless it existed in the GAT response. Thus the system can expect the cloud-based platform Shadow to have the information needed.

In some embodiments, the system can get the sha1 for the local file by looking in the Local File System Shadow for the location of the file's parent. Some embodiments transform this path-to-parent so that it maps to the <foldername_archive> as root rather than the new cloud-based platform sync folder (which may not yet have the file). Some embodiments append the filename to the modified path and go look at this new fullpath to see if there is a file there and get its sha1.

The calculation of the on-disk sha1s can be optimized in some embodiments by leveraging existing sync client data (e.g., data from older sync client version). In some embodiments, the old sync client keeps a file with sha1, filepath, and timestamp data. This data may be from the last scan of the old sync client. That does not mean that this data was uploaded to the remote cloud-based system or that these sha1 values match what the remote cloud-based system has. It can just be the sha1 of the file at the time of the last scan. Certain embodiments can use this file of sha1s as a cache and simply check the timestamp on the file against the timestamp for the listed sha1. If the file's timestamp is greater than the recorded timestamp then the file migration system recalculates the local sha1. Otherwise the system can use the recorded value rather than recalculating.

Once the system is done moving all the matching items from the archive location to the new synchronization folder, the archive location can be the desired problem item archive. Certain embodiments may go back and recursively remove any directories which are empty so that only files and directories along the path to problem items are left.

An example pseudo code for migrating files to a target sync folder from an old sync folder is provided below.

```
class SyncEventExecutor(SyncThread):
...
    def _create(self, target_sync_api, sync_event):
...
        if item_type == ItemType.FILE:
            # get the content stream from the source file system
            get_sync_result = self._get_file_content(item_id)
            stream_ok = get_sync_result.succeeded
            content_stream = get_sync_result.content_stream
            if stream_ok:
                locked_id = locked_ids.lock((parent_of_new_item.item_id, name))
                remote_assert(locked_ids.is_locked(locked_id))
                if get_sync_result.do_move:
                    # new path will be generated by joining parent path with item name
                    sync_result = shutil.move(get_sync_result.archive_path, new_path)
                else:
                    sync_result = target_sync_api.create_item(
                        name=name,
                        item_type=item_type,
                        parent_item_id=parent_of_new_item.item_id,
                        content_stream=content_stream
                    )
...
    def _get_file_content(self, item_id):
        if sync_event.fs_adapter_id == remote_fs_id and self._migration_mode_flag == True:
            item_name = self._shadow_item_stores(remote_fs_id).get_item_name(item_id)
            parent_id = self._shadow_item_stores(remote_fs_id).get_parent_id(item_id)
            parent_path = self._shadow_item_stores(local_fs_id).get_path_from_item_id(parent_id)
            item_fullpath = os.path.join(self._migration_archive_folder_path, parent_path, item_name)
            local_sha1 = self._get_local_sha1_for_file(item_fullpath)
            remote_sha1 = self._shadow_item_stores(remote_fs_id).get_sha1(file_id)
            if local_sha1 == remote_sha1:
                sync_result = SyncResult(succeeded = True, content_stream = None)
                sync_result.do_move = True
                sync_result.archive_path = item_fullpath
                return sync_result
        return self._fs_sync_apis[sync_event.fs_adapter_id].get_content_stream(item_id)
    def _get_local_sha1_for_file (self, path):
        local_sha1 = 0
        if os.path.exists(item_fullpath):
            local_sha1 = calculate_sha1(item_fullpath) #
Will use a cache file from old sync client to save calculations
        return local_sha1
```

In some embodiments, finding the path to do the explicit move in the executor may be difficult since none of the code in certain existing embodiments knows about paths. In certain alternative embodiments, the system can open the archive file in _get_file_content and set the content_stream to that file. The system can then stream in the file which is all stream based in some embodiments. The system could also just do a create when a create command is issued in some embodiments. Some additional code can be added to delete the archive file after the system has completed streaming in the content. In some embodiments, this can potentially lead to an error where the system streams in the content but fails to do the delete.

Some embodiments can pre-calculate a table of local sha1s. By doing so, the system need not use resources to find the matching archive file and calculate its sha1 on the fly. This may avoid having to touch the local shadow entirely. However, in some embodiments this may precipitate more work than necessary. The system might calculate sha1s for files that don't exist on the remote cloud-based system. This may be mitigated by the existing old sync client sha1 file which may already have the majority of the sha1 values calculated. Another potential problem in some embodiments may arise if the user edits a file after the system has calculated the table of sha1s. The system could lose the local edit in that case. This situation is mitigated as well in some embodiments, since the system will be notifying the user that it's doing a migration and that any edits they may perform during migration may be lost. Another issue in some embodiments would be the large up-front cost for sha1 calculation. This again can be mitigated by the old sync client sha1 file.

In some embodiments, the remote file system sync API (remote_fs_sync_api) can be modified instead of the sync event executor as shown above. However, APIs should ideally remain clean and should not know about shadows or migration or the local filesystem. Therefore, putting this change in the executor may be the cleanest place in some embodiments.

One of the initial steps in the file migration is to move the user's old data to some <foldername_archive> location. On devices based on the MAC platform which has a Unix-like file system doing this move should not cause any problems. On devices based on the WINDOWS platform the system may run into issues if some file in that folder tree is in use by the user or some process. Certain embodiments of the file migration system can mitigate this problem on WINDOWS.

For example, the system could simply not rename the folder. Suppose the old sync client names the sync folder "Documents" while the new sync client names the folder "Sync". Thus there will not be a name collision in some embodiments. Even users that have specified their own sync point will not run into a collision in some embodiments, since choosing a sync point simply lets the user choose the parent for the sync folder.

In some embodiments, the system could iterate over the whole tree looking for files that are already in use. If the system finds any file in use, the system could prompt the user to close the handle to the file. At the end of the scan the system could try to do the move/rename. If it fails again the system could do another scan & repeat. This approach lets the system actually rename the folder but it is somewhat slow in some embodiments, relies on user interaction, and could loop a number of times because of race conditions.

In some embodiments, a separate user interface (UI) with progress bar can be provided to show the progress in migration. In alternate embodiments, the system can present the user with a notification that the first sync is pulling down files from the cloud-based platform. Alternately, the system can prevent the user from knowing that the system is optimizing by pulling their local files. In some embodiments, on uninstall of the old sync client, the system can write out a file of sha1 to file path. In some embodiments, the SyncEventExecutor class can be subclassed and have the migration specific code live in this special subclass which is only instantiated when we're in a sync folder migration. In alternate embodiments, the migration specific code can be added to the existing SyncEventExecutor class.

Performance Framework

Various embodiments of the present disclosure can perform sync operations efficiently while maintaining as small a resource footprint as possible. Some aspects of the Performance Framework disclosed herein increase visibility into the most vital areas of the sync client performance and improve performance.

Some of these embodiments monitor system performance and generate an alert when the system performance as a whole degrades drastically or when it falls below certain thresholds. This can be done on each build.

Some embodiments support in-depth diagnostics of the sync client which allow developers to see the performance of each part of the sync engine. Some embodiments provide a sandbox where one can compare different implementations and changes.

The improvements to visibility of performance issues and data can be such that developers do not have to actively seek out information. The basic data can be easily and passively available to all sync developers. Any major degradation or failure of a performance threshold can be noisy so that developers/users are actively aware when performance issues arise. Some embodiments provide various tools for diagnosing performance degradation to be in good working order.

In some embodiments, the Performance Framework is regularly exercised so that it does not fall out of use and become out of date. Allowing this to happen can mean that some system tools can become un-usable.

Example Implementation

To measure a sync client's overall performance some embodiments can use Black-box testing of the actual application. Running the actual application can give a more accurate measure of performance rather than trying to do a summation over parts.

Chimp is already useful for doing Black-box testing. Some embodiments leverage Chimp to do performance measurement as well. Some embodiments use Jenkins (or any other application that monitors execution of repeated jobs) to run these Chimp jobs on each build much like existing Chimp tests. This can provide the data to generate alerts when the performance degrades below a certain level. These runs can also provide data to show the developer team per-build performance changes.

Certain embodiments can measure one or more of the following:

CPU usage (peak, mean, graph-over-time, 90% percentile)

Measure in CPU seconds to try to reduce variance

Memory usage (peak, mean, graph-over-time, 90% percentile)

SQLite usage (count of calls against local database)

Network usage

Disk usage

Some embodiments use code in Chimp to run and measure the sync client resource usage. In some embodiments, this code may not span all of the data points to be measured. Some embodiments create new Jenkins jobs for these performance Chimp runs. Some embodiments build a way to send alerts to developers when performance degrades too much (either in % change build over build or in absolute terms). Some embodiments can use dedicated hardware for performance runs.

To support in-depth diagnostics some embodiments use in-code instrumentation. Instrumentation can include using cProfile and Pympler and others. cProfile provides a deterministic profiling of Python programs, where a profile is a set of statistics that describe how often and how long various parts of the program are executed. Pympler is a development tool for measuring, monitoring and analyzing the memory behavior of Python objects in a running Python application. In some embodiments, one or more of memory usage and time spent in each class or function can be measured using the diagnostic tools.

Tray Icon Embodiments

In some embodiments, the sync client Tray Icon can give the user a high level overview of the state of sync, and the Tray Icon Menu can allow the user to get more detailed information or perform common tasks. The Tray Icon controller can be responsible for managing the state of the sync and for generating the necessary Menu Items.

The Tray Icon Controller can be capable of managing the state transitions, as well as any future transitions that may be deemed necessary. In some embodiments, the code can be cross platform wherever possible, and interface with the platform specific C# and Objective-C used to display the user interface UI.

In some embodiments, there are three pieces to managing the Tray Icon state: The SyncAppStatus object, which is responsible for maintaining the high level state of the sync client; the TrayMenuController, which is responsible for building the Tray menu based upon the state of the sync client; and the TrayIconController, which is responsible for presenting the correct TrayIcon based upon the state of the sync client.

SyncAppStatus

The SyncAppStatus can be a model object that represents the state of the Sync application. The public API, for example, can look like:

```
def current_status(self) # returns current :class:'SyncAppStatusValue'
object
```

The possible states of the SyncAppStatus can be given by the SyncAppStatusValue enum:

```
class SyncAppStatusValue(Enum):
    LOGGED_OUT # No user is logged in
    ERROR_STATE # An error has been encountered
    OFFLINE # Sync is unable to connect to the internet
    IN_PROGRESS # Sync is actively syncing files
    SCANNING # The monitor is searching for changes, but none have been found
    COMPLETE # All files are synced (except for problem files)
```

The SyncAppStatus can determine its current status by using a priority ordered list of the possible states. The current sync app status can be taken to be the state with the highest priority order that matches the state of the components of the sync application. If no state is matched, sync can be assumed to be in completed state in some embodiments. The following example depicts this more concretely:

```
_priority_ordered_status_methods : OrderedDict([
    (self._is_logged_out_status, SyncAppStatusValue.LOGGED_OUT),
    (self._is_error_status, SyncAppStatusValue.ERROR_STATE),
    (self._is_offline_status, SyncAppStatusValue.OFFLINE),
    (self._is_in_progress_status, SyncAppStatusValue.IN_PROGRESS),
    (self._is_scanning_status, SyncAppStatusValue.SCANNING),
])
_default_status_value = SyncAppStatusValue.COMPLETE
def _calculate_current_status(self):
    for status_method, status_value in
_priority_ordered_status_methods.iteritems( ):
        if status_method( ):
            return status_value
    return _default_status_value
```

In some embodiments, the status methods can be implemented by listening to notifications from the sync framework. For example, OFFLINE can be determined by listening to communication failure notifications, LOGGED_OUT by listening to authentication failure notifications, etc. Some of the notifications in the sync framework do not exist for the required states (like ERROR_STATE) or are not sufficiently granular in some embodiments. In these cases, additional notifications can be added with minimal effort.

When a notification that can change the sync app status is received, the new value is recorded, and the current sync status is updated. If the current sync status has changed, a notification can be sent containing the new sync status. This looks like (for example):

```
# Similarly for other notifications that SyncAppStatus listens to
def _communication_status_changed(self, fs_adapter_id,
communication_status):
    if communication_status != self._communication_status:
        self._communication_status = communication_status
        self._update_current_status( )
def _update_current_status(self):
    new_status = self._calculate_current_status( )
    if new_status ! = self._current_status:
        self._current_status = new_status
        self._notify_current_status( )
```

```
def _notify_current_status(self):
    NotificationCenter.get_shared_instance( ).notify(
        UINotification.SYNC_APP_STATUS_CHANGED,
        current_status=self._current_status,
    )
```

A possible addition to this would be the inclusion of a minimal time per state. For example, when a scan is very quick, it could mean that the state would change from completed→scanning→completed again very rapidly, resulting in a jarring user experience. In order to prevent this, in some embodiments, on status changes, the time of the change can be recorded, and if another change occurs before some minimal stabilization period, the second change can be deferred until the stabilization period completes. This minimal time can be set on a per SyncAppStatusValue basis in order to provide the best user experience possible.

The logic for this minimal display time could look, for example, like the following steps:

A transition occurs

The current time is compared with the time of the last transition. If it is greater than the minimal time, the transition happens normally. Otherwise, it is scheduled to occur the minimal time after the last transition time.

If another transition occurs before the scheduled transition is applied, replace the scheduled transition with the new transition, and apply at the minimal time after the last transition time.

This allows maximum responsiveness when transitioning from complete to scanning state so that user changes are reflected in the UI immediately.

TrayMenuController

In some embodiments, the TrayMenuController can be responsible for building the correct menu to show for a given sync app status. It can work by manipulating a single, pre-built menu object to show, hide, and update menu items based on the status of the sync app. The actual menu item updates can be performed in a platform specific way by subclassing the TrayMenuController for both Mac and Windows.

The menu can be built containing all of the possible menu items in the native layout manager in some embodiments (Interface Builder for Mac and Designer for Windows). On a SYNC_APP_STATUS_CHANGED notification, the TrayMenuController can hide and show menu items as appropriate for the current status. It can also update the text for dynamically generated menu item titles based on the current state of the application. This can look like, for example:

```
_MenuItemIndicies(Enum):
    LOG_IN = 0
    HELP = 1
    STATUS = 2
    TIME_REMAINING = 3
    ERRORS = 4
    PAUSE = 5
    SYNC_FOLDER = 6
    WEB_SITE = 7
    PREFERENCES = 8
    QUIT = 9
@on_main_thread
def _sync_app_status_changed(self, sync_app_status):
    if sync_app_status != self._sync_app_status:
        self._sync_app_status = sync_app_status
        self._update_visible_menu_items( )
        self._update_dynamic_titles_for_menu_items( )
def _update_visible_menu_items(self):
    for index in iter(_MenuItemIndicies):
        if self._should_show_menu_item(index):
            self._show_menu_item(index)
```

```
    else:
        self._hide_menu_item(index)
def _update_dynamic_titles_for_menu_items(self):
    for index in self._menu_items_with_dynamic_titles:
        dynamic_title = self._dynamic_title_for_menu_item(index)
        self._set_menu_item_title(index, dynamic_title)
```

In the above example, _show_menu_item, _hide_menu_item, and _set_menu_item_title are abstract methods which are implemented in the platform specific base classes. Additionally, there are two lookup methods that can be implemented by the TrayMenuController: _should_show_menu_item and _dynamic_title_for_menu_item. The former can be built from a static dictionary that, for a given index and sync_app_status pair, determines whether or not the menu item should be visible.

In general, the dynamic titles look like, for example:
Syncing 101 of 503 files

There are three pieces to this string: the unformatted message (for localization, both the singular and pluralized forms are required); the list of methods to generate the format arguments; and the method to determine the pluralization. This can be represented by a MenuItemDynamicTitle object, with, e.g., the following public API:

```
def _init_(self, unformatted_singular_title,
    unformatted_plural_title, format_argument_method_list,
    pluralization_method)
def format(self)
```

For example, consider the above string ('Syncing 101 of 503 files'). The unformatted singular title could be:
'Syncing { } of { } file'
The unformatted plural title could be:
'Syncing { } of { } files'
The format_argument_method_list can be a list of accessor methods to access the arguments for formatting the string. In this case they might be:
[self._files_remaining_to_sync, self._total_files]
Note that these are accessors, not ivars. The pluralization_method can be used to determine whether the plural or singular form should be used. If the pluralization_method returns 1, the singular form can be used. Otherwise, the plural form is used. In this case it would just be the second format argument:
self._total_files The format method can then format the string by calling the bound methods, and generate the full localizated, formatted string for display. Finally, the TrayMenuController can subscribe to notifications related to all state needed to produce the dynamic titles (e.g., number of files remaining to sync). A response to such a notification can look like:

```
@on_main_thread
def
_files_remaining_to_sync_changed(self, files_remaining_to_sync):
    if files_remaining_to_sync != self._files_remaining_to_sync:
        self._files_remaining_to_sync = files_remaining_to_sync
        self._update_dynamic_titles_for_menu_items( )
```

TrayIconController

The TrayIconController can be responsible for updating the tray icon in response to changes in the SyncAppStatus Like the TrayMenuController, the TrayIconController consists of a platform independent base class, with direct interaction with the Objective-C and C# constructs in the platform specific subclasses.

In some embodiments, on a SYNC_APP_STATUS_CHANGED notification, the TrayIconController can update the tray icon to the appropriate image. In the case of animated icons for status values, some embodiments can make use of the existing AnimatedStatusIcon class, and the TrayIconController need only start the correct animation sequence. Ensuring complete animation cycles before transitions can be implemented via the SyncAppStatus minimal time between state transitions in some embodiments.

Components of a Sync Client

Figure 6A:
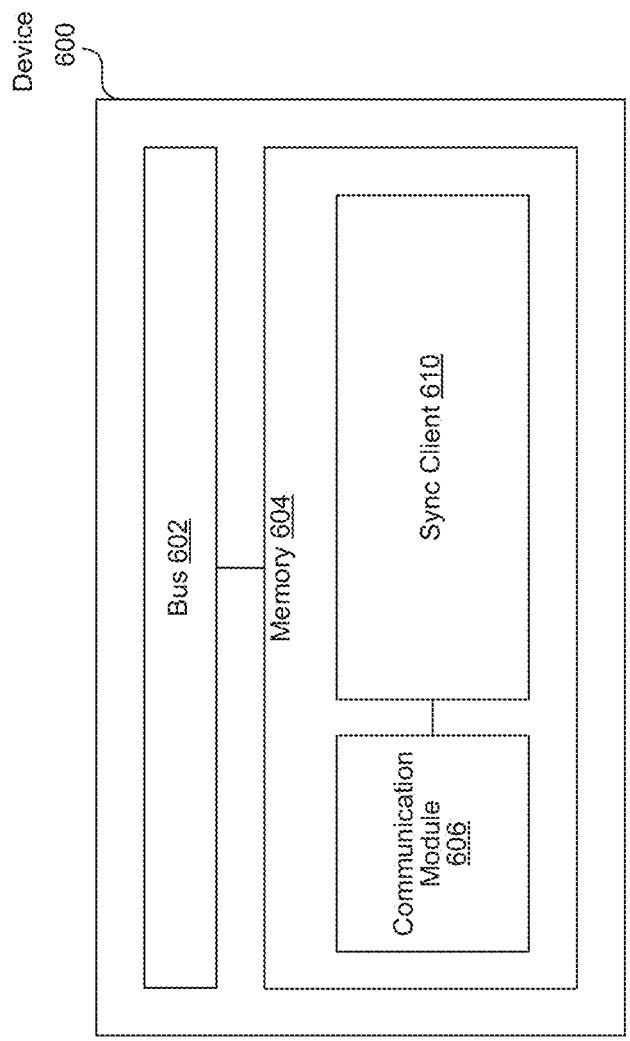
FIG. 6A depicts a block diagram illustrating example components of a device having a synchronization client of a cloud-based platform that manages upgrades, migration of user data and improves performance of the cloud-based platform.
Figure 6B:
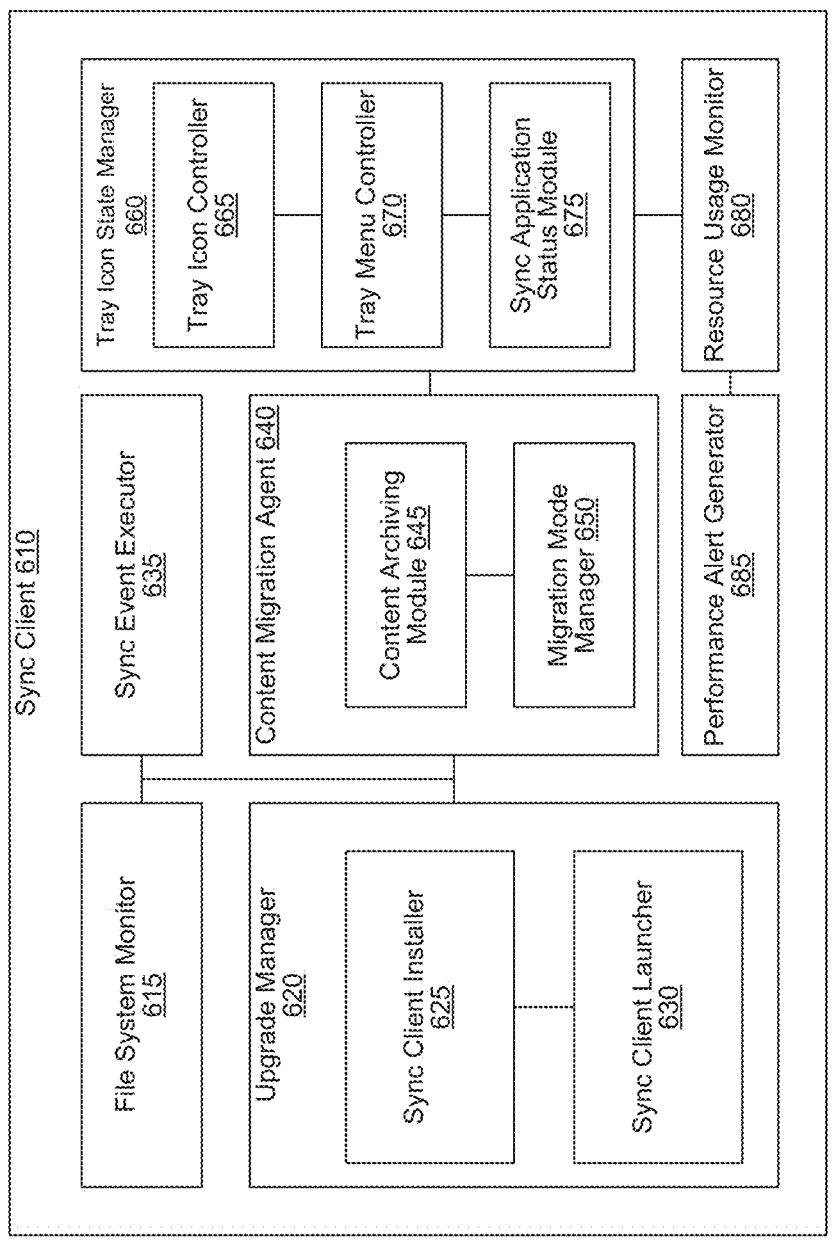
FIG. 6B depicts a block diagram illustrating example components of the synchronization client of FIG. 6A.

FIG. 6A depicts a block diagram illustrating example components of a device having a synchronization client of a cloud-based platform that manages upgrades and migration of user and improves performance of the cloud-based platform. FIG. 6B depicts a block diagram illustrating example components of the synchronization client of FIG. 6A.

As used herein, a module, a manager, an installer, a launcher, an executor, an agent, a controller and a generator includes a general purpose, dedicated or shared processor and, typically, firmware or software modules that are executed by the processor. Depending upon implementation-specific or other considerations, the module, manager, interface, or engine can be centralized or its functionality distributed. The module, manager, interface, observer, builder, scanner, pipeline, filter, detector, generator, re-orderer or engine can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. § 101), and to specifically exclude all media that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The device 600 can include, for example, a bus 602, and a memory 604 among other components. The memory 604 can include, among others, a sync client 610 and a communication module 606. The communication module 606 facilitates communication among the device 600, the host server 100 using any of the communication protocols that are supported. The memory 604 may also include other device modules (not shown in FIG. 6A for simplicity) such as a GPS module for determining and providing location information, text input module for accepting and processing inputs provided using different input mechanisms of the mobile device, and the like for handling various functions of the device 600. It is noted that the aforementioned modules are intended for purposes of enabling the present embodiments, rather than limiting. As such, a person of ordinary skill in the art will understand that the present disclosure covers apparent alternatives, modifications, and equivalents (e.g., combining or separating the modules) made to the techniques described herein. Additional or less components/modules/engines can be included in the device 600 and each illustrated component.

The bus 602 is a subsystem for transferring data between the components of the mobile device 600. For example, the bus 602 facilitates the transfer of data between the memory 604 and other components of the device 600 such as the processor and/or the input/output components that utilize the data.

Referring to FIG. 6B, example components of the sync client 610 can include, a file system monitor 615, an upgrade manager 620 having a sync client installer 625, a sync client launcher 630, a sync event executor 635, a content migration agent 640 having a content archiving module 645 and a migration mode manager 650, a tray icon state manager 660 having a tray icon controller 665, a tray menu controller 670, a sync application status module 675, a resource usage monitor 680 and/or a performance alert generator 685. Other embodiments may include more or less components.

The file system monitor 615 in some embodiments scans the file system (e.g., the sync folder or sync directory) on the device 600 in response to notifications of change in items such as files and folders. The file system monitor 615 can generate one or more shadows or snapshots using which a state of the file system at any point in time can be determined.

In a WINDOWS platform, the upgrade manager 620 via the sync client installer 625 can, in some embodiments, receive upgrade or update notification from the rss feed of the software update framework and in response build and run a batch file. The sync client launcher 630 can, in some embodiments, install the new sync client, retrieve username and sync point from old sync client files (e.g., .yaml file) and write the retrieved information on a file in the new sync client. The sync client installer 625 can also clean up old sync client files. The sync client launcher 630 can use the username and sync point location written on the file to launch the new sync client.

In a MAC platform, the upgrade manager 620 via the sync client installer 625 can, in some embodiments, can create a temporary folder for a new sync client application, fetch username and sync point from old sync client files. The sync client launcher 630 can take the username and sync-point, copy the new sync client application to an application folder and launch the sync client application with the username and sync-point.

The sync client migration agent 640 can migrate files and folders from the old sync client to the new sync client, as each sync client has a different location for keeping synced files and folders. In order to reduce resource consumption and speed up the migration process, the content archiving module 645 archives files and folders from the old sync client's location (old sync folder) to another location (archive location) before beginning the migration process. The migration mode manager 650 can set the flag when the sync client is in the migration mode and clear the flag when all the items that can be moved from the archive location have been moved and all the items that needed to be downloaded from the remote cloud-based platform have been downloaded. In some embodiments, the content migration agent 640 relies on the sync event executor 635 for populating the new sync folder with items from the archive location and/or from the cloud-based platform.

Figure 7:
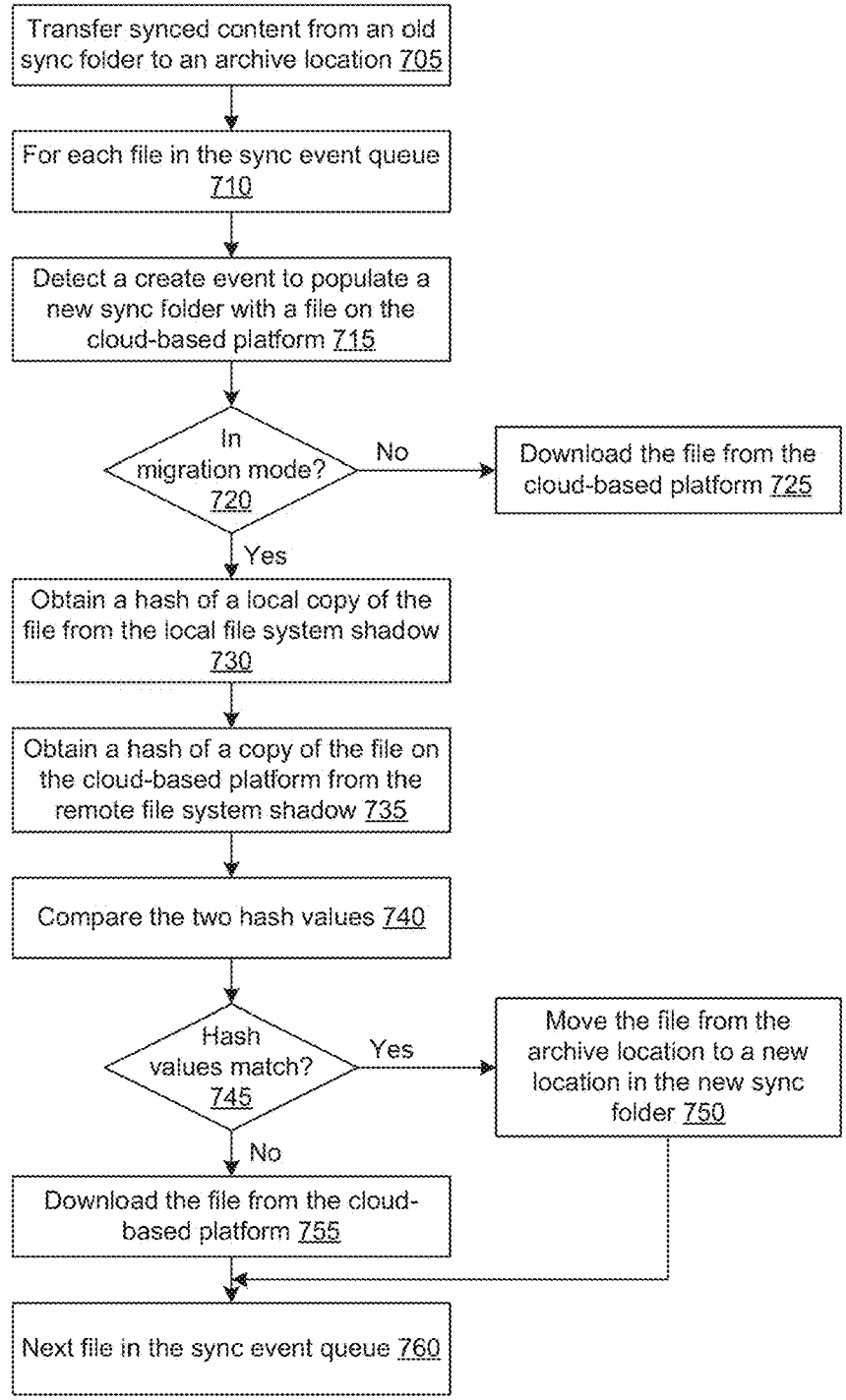
FIG. 7 depicts a logic flow diagram illustrating an example method of populating a new sync folder during an upgrade of a synchronization client of a cloud-based platform.

As described in FIG. 7, the sync event executor 635, on detecting a create event for an item from the remote cloud-based platform, when the sync client is in migration mode, does not immediately download the item from the remote cloud-based platform. Instead, the sync event executor 635 determines whether a local copy of the item has the same state as a remote copy of the item at the cloud-based platform. The determination is based on hash of the item. The sync event executor 635 can, in some embodiments, look up a location of the item's parent in a local file system shadow to determine a path to parent and modify the path to parent to map to the archive location. The sync event executor 635 can then append a filename of the item to the modified path to obtain a full path. Using the full path, the sync event executor 635 can find the local copy of the item and obtain a hash of the local copy of the item. In some embodiments, the sync event executor 635 using a hash function can determine the hash of the item. In some embodiments, a file including pre-calculated hash, filename and timestamp can be used as a cache to compare the timestamp of hash of the item and the timestamp for the item itself. If the timestamp for the hash is later, the sync event executor 635 need not recalculate the hash. If the timestamp for the item is later, then the sync event executor 635 can recalculate the hash. By not having to calculate hash each and every time, resources can be saved.

In some embodiments, the sync event executor 635 can compare the hash of the item in the archive location with a hash of a remote copy of the item (e.g., determined from the remote file system shadow obtained or maintained by the file system monitor 615 using an API method). If the two hashes match, the sync event executor can move or transfer the item from the archive location to the location of the new sync folder to populate the new sync folder. Similarly, if the two hashes are a mismatch or the item cannot be found locally, the sync event execute can execute the create event which involves creating a copy of the item in the new sync folder by downloading the item from the cloud-based platform. Once all the matching items have been moved from the archive location to the new sync folder location, the archive location can be the problem item archive that includes the problem items that could not be moved.

Figure 10:
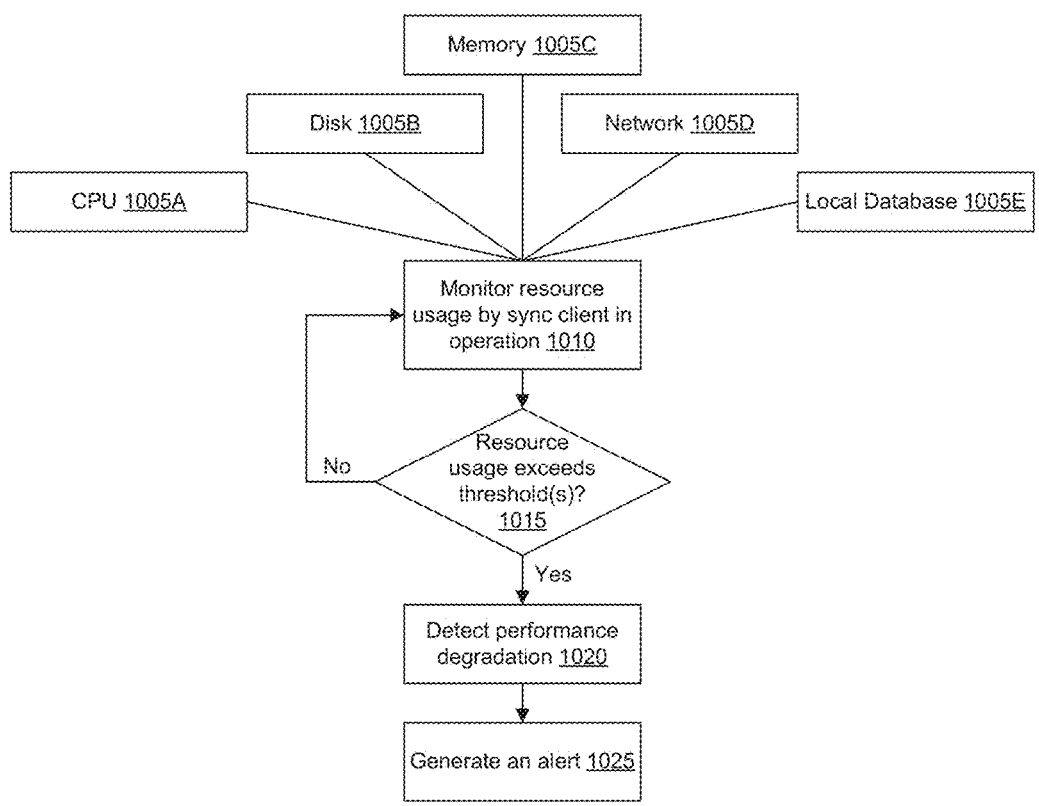
FIG. 10 depicts a logic flow diagram illustrating an example method of monitoring resource usage by a synchronization client of a cloud-based platform.

The resource usage monitor 680, as described in detail in FIG. 10, monitors usage of various resources by the sync client when it is in operation. For example, the resource usage monitor can monitor and track use of memory, disk, CPU, network, local database and/or other resources. In some embodiments, the resource usage monitor 680 can also monitor and track, via in-code instrumentation, performance and resource consumption behavior of various classes or functions. In some embodiments, the performance alert generator 685 can compare the resource usage with one or more thresholds to determine whether to generate an alert directed to developers. In some embodiments, an aggregate performance metric can be generated by a component (not shown) or by the resource usage monitor 680 that takes into consideration one or more of the resources listed above. For example, one performance metric can weigh CPU and memory usages are more heavily than other resources. The alert can be generated when the aggregate performance metric falls below a threshold indicating degradation of the performance of the sync client. In some embodiments, one or more of the monitored resources may be compared against their respective thresholds in determining whether to generate an alert.

In some embodiments, the tray icon state manager 660 can configure the sync client tray menu and tray icons based on the state or status of the sync operations, allowing the user to quickly obtain the status of the sync operations. In some embodiments, the sync application status module 675 represents the state of the sync client. Example states of the sync client can include: logged out, error state, offline, in progress, scanning and complete. In some embodiments, the sync application status module 675 determines its current status as the state with the highest priority order than matches the state of the components of the sync client. If there is no match, the sync client can be assumed to be in completed state. In other embodiments, the sync application status module 675 can determine its current status based on notifications from the sync client framework. In some embodiments, the state of the sync client can go through multiple transitions in a short amount of time which can impact the user experience. In some embodiments, the sync application status module 675 can manage the state transition by ensuring that each state is maintained for a minimum period of time. If a transition occurs before that minimum period of time, the sync application status module 675 can schedule that transition to take effect after the minimum period of time expires. In the event that another transition occurs even before the scheduled transition can take effect, the sync application status module 675 can replace the scheduled transition with the latest transition.

The tray menu controller 670 can configure and/or reconfigure a menu tray for a given sync application status from the sync application status module 675. The reconfiguring can include showing, hiding and/or updating menu items, textual descriptions, etc. The tray icon controller 665 can update tray icons based on the sync application status change notification from the sync application status module 675.

FIG. 7 depicts a logic flow diagram illustrating an example method of populating a new sync folder during an upgrade of a synchronization client of a cloud-based platform.

In the example method, at block 705, a sync client transfers synced content from an old sync folder to an archive location. For each file in the sync event queue at block 710, the sync client (e.g., via the sync event executor 635) detects a create event to populate a new sync folder with a file on the cloud-based platform at block 715. At decision block 720, the sync client determines if the sync client is in migration mode. If not, the sync client downloads the file from the cloud based platform at block 725 as part of executing the create event. If, on the other hand, the sync client is in migration mode, the sync client obtains a hash of a local copy of the item from the local file system shadow at block 730. The sync client also obtains a hash of a copy of the file on the cloud-based platform from the remote file system shadow at block 735. Based on comparison between the two hashes at block 740, the sync client determines whether the hash values match at decision block 745. If the two hash values match, the sync client executes a move event to move the local file from the archive location to a new location in the new sync folder at block 750. The sync client then processes other events in the sync queue at block 760. At decision block 745, if the hash values are a mismatch, the sync client downloads the file from the cloud-based platform at block 755.

Figures 8A, 8B:
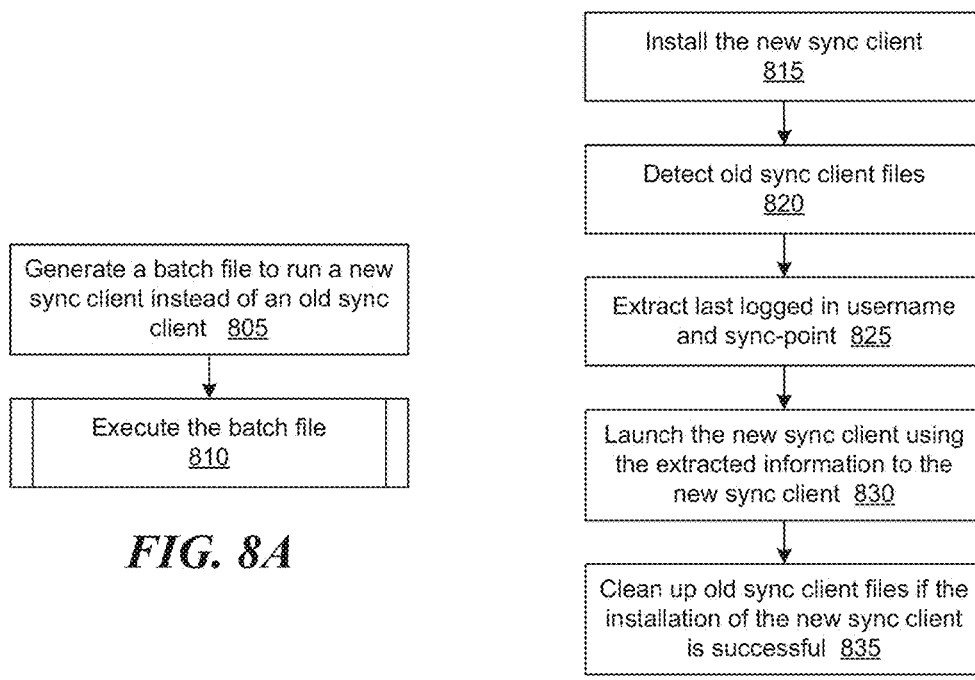
FIGS. 8A and 8B depict logic flow diagrams illustrating example methods of upgrading a synchronization client of a cloud-based platform for WINDOWS platform.

FIGS. 8A and 8B depict logic flow diagrams illustrating example methods of upgrading a synchronization client of a cloud-based platform for Windows platform.

Referring to FIG. 8A, at block 805, an old sync client that is to be upgraded receives update notification from a software update framework and in response generates a batch file to run a new sync client. At block 810, batch file is executed, typically by a shell program (command line) provided by the operating system. The execution process of the batch file is described with respect to FIG. 8B. At block 815, the new sync client is installed on the device. At block 820, old sync client files are detected and information such as last logged in username and sync-point are extracted from the old sync client files at block 825. At block 830, the new sync client is launched with the extracted information. The new sync client then cleans up the old sync client files if the installation of the new sync client is successful.

Figure 9:
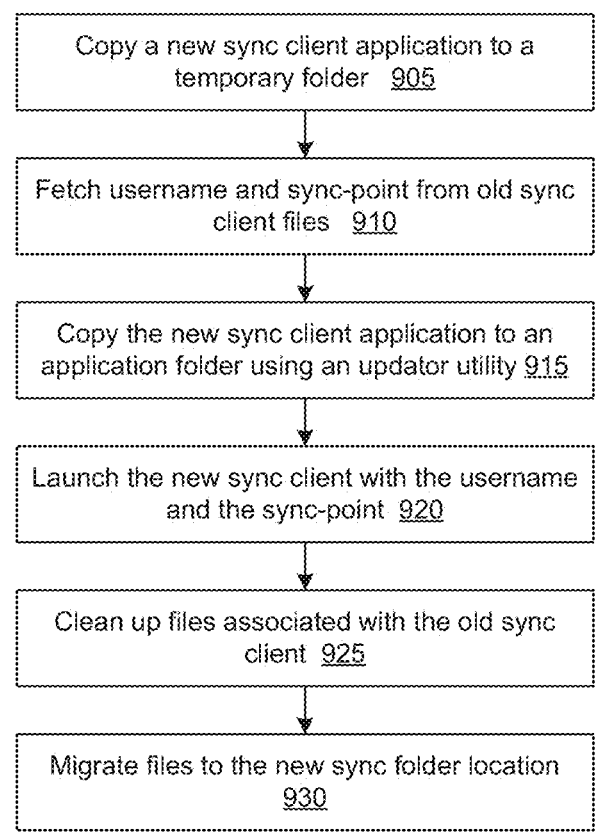
FIG. 9 depicts a logic flow diagram illustrating an example method of upgrading a synchronization client of a cloud-based platform for MAC platform.

FIG. 9 depicts a logic flow diagram illustrating an example method of upgrading a synchronization client of a cloud-based platform for a MAC platform.

As illustrated, at block 905, an installer copies a new sync client application to a temporary folder. At block 910, the installer fetches the username and sync-point from old sync client files. At block 915, the installer copies the new sync client application to an application folder using an updator utility and launches the new sync client with the username and the sync-point at block 920. At block 925, the new sync client can clean up the old sync client files and start migrating files to the new sync folder location from the archived location at block 930.

FIG. 10 depicts a logic flow diagram illustrating an example method of monitoring resource usage by a synchronization client of a cloud-based platform. The sync client (e.g., via the resource usage monitor 680) can monitor resource usage by the sync client in operation at block 1010. The resources that can be monitored can include usage of CPU 1005A, disk 1005B, memory 1005C, network 1005D, local database 1005E and/or the like. At decision block 1015, the sync client (e.g., via the performance alert generator 685), evaluates the monitored resource usages against one or more thresholds (e.g., threshold for each individual resource usage or an aggregate threshold for a performance metric) to determine if the resource usage exceeds the thresholds. If not, the performance is considered to be normal and the sync client can continue to monitor resource usage. If the resource usage exceeds the thresholds, the sync client detects performance degradation at block 1020. In some embodiments, the sync client can characterize the level of performance degradation. At block 1025, the sync client can generate an alert to notify developers regarding performance degradation in performing sync operations, along with resource usage data collected by the sync client.

Figure 11:
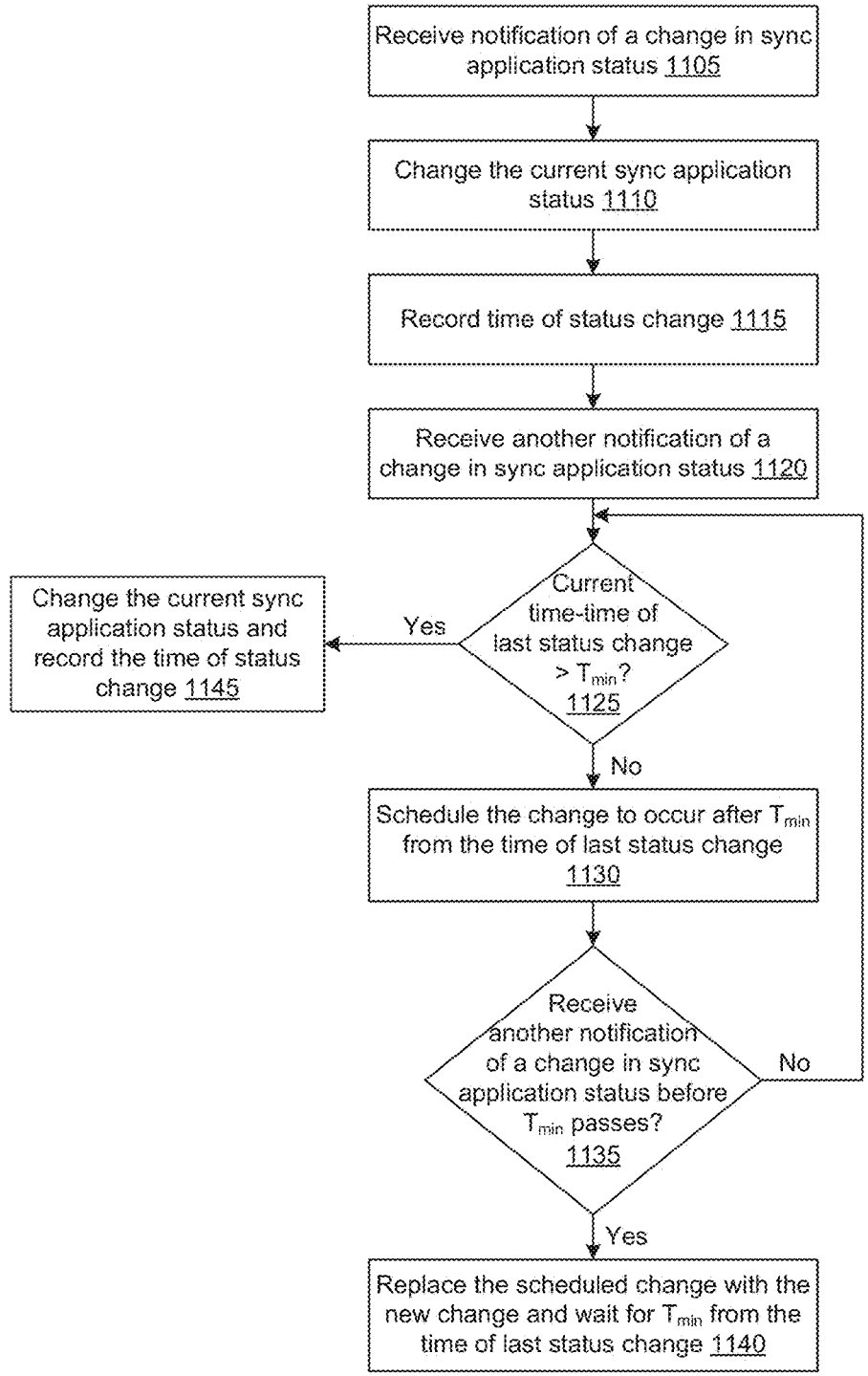
FIG. 11 depicts a logic flow diagram illustrating an example method of managing sync application or client status by a synchronization client of a cloud-based platform.

FIG. 11 depicts a logic flow diagram illustrating an example method of managing sync application or client status by a synchronization client of a cloud-based platform.

As illustrated, the sync client (e.g., via sync application status module 675) receives a notification of a change in sync application (or client) status at block 1105. At block 1110, the sync client changes the current sync application status in response to the notification. At block 1115, the sync client records the time of the status change. At block 1120, the sync client receives another notification of a change in the sync application status. At decision block 1125, the sync client determines whether more than a threshold amount of time ($T_{min}$) has passed since the last status change. If so, the sync client can change the current sync application status at block 1145 and record the time of the change. Conversely, if the notification of the change has arrived before the threshold amount of time has passed, the sync client schedules the change to occur after the threshold amount of time from the time of the last status change at block 1130. If yet another notification of a change in the sync application status is received before the scheduled change can occur at decision block 1135, the sync client can replace the scheduled change with the new change and wait for $T_{min}$ period of time from the time of the last status change to update the status. Conversely, if the notification from block 1135 is received after $T_{min}$, the scheduled change from block 1130 likely took effect and thus, the process moves to block 1125 for timing evaluation.

Figure 12:
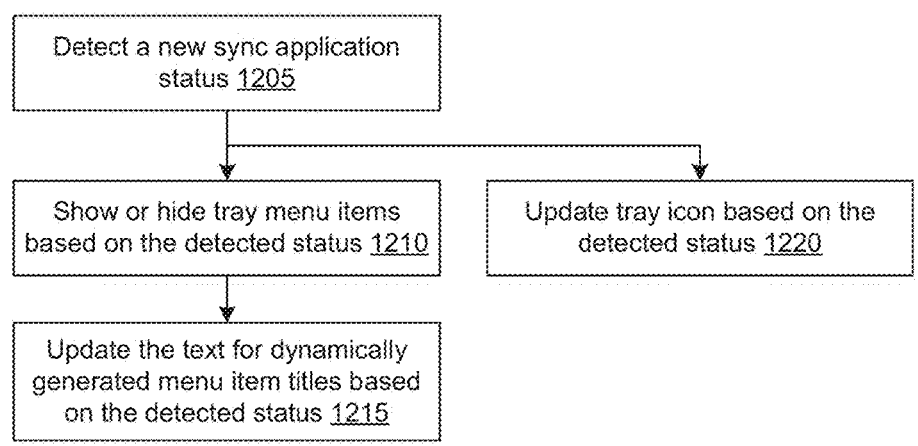
FIG. 12 depicts a logic flow diagram illustrating an example method of using sync application or client status to update tray menu items and tray icons of user interface by a synchronization client of a cloud-based platform.

FIG. 12 depicts a logic flow diagram illustrating an example method of using sync application or client status to update tray menu items and tray icons of user interface by a synchronization client of a cloud-based platform.

As illustrated, the sync client can detect a new sync application status at block 1205. At block 1210, the sync client can show or hide tray menu items based on the detected status to configure the tray menu for the new sync application status. At block 1215, the sync client can update the text for dynamically generated menu item titled based on the detected status. In some embodiments, at block 1220, the sync client can also update the tray icon based on the detected status.

Figure 13:
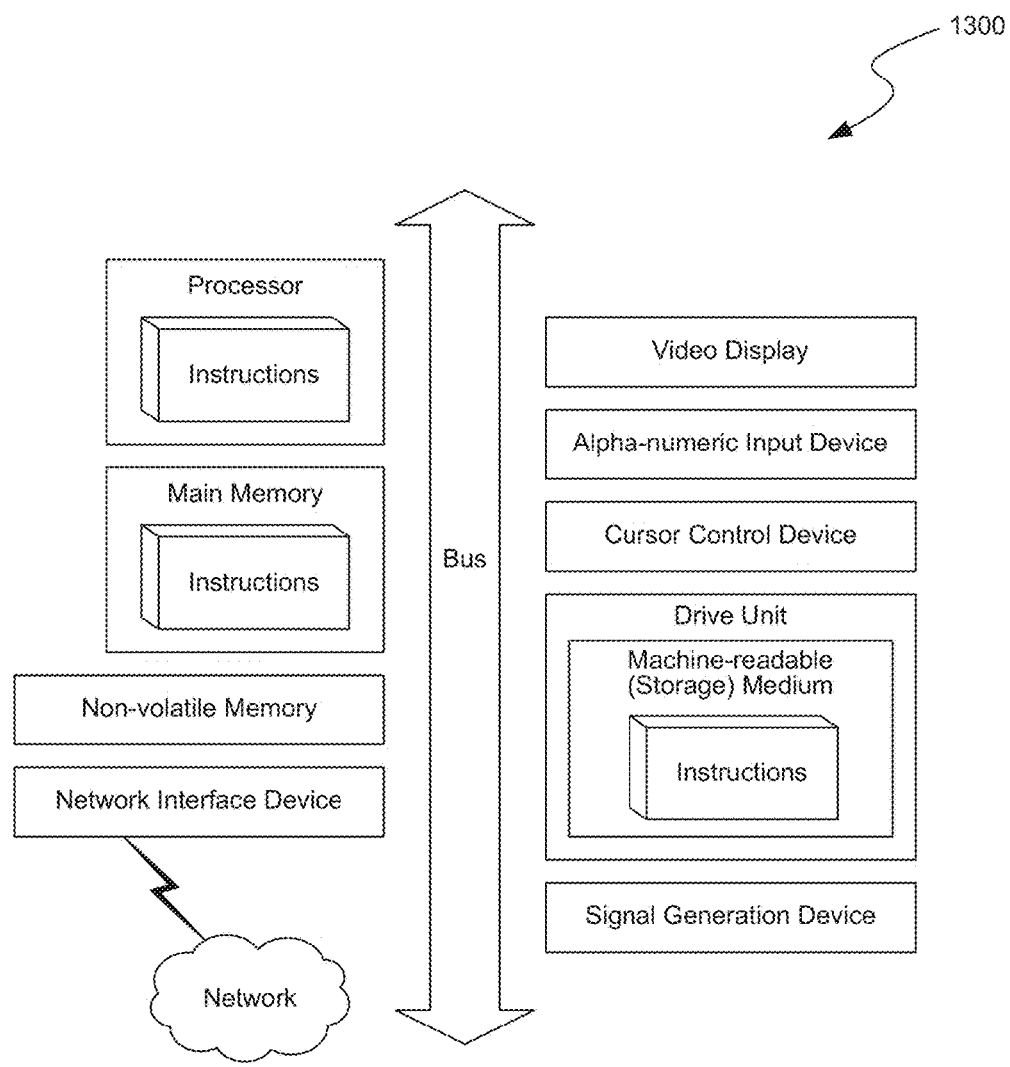
FIG. 13 depicts a diagrammatic representation of a machine in the example form of a computer system within which a set of instructions, for causing the machine to perform any one or more of the methodologies discussed herein, can be executed.

FIG. 13 shows a diagrammatic representation 1300 of a machine in the example form of a computer system within which a set of instructions, for causing the machine to perform any one or more of the methodologies discussed herein, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a user device, a tablet, a phablet, a laptop computer, a set-top box (STB), a personal digital assistant (PDA), a thin-client device, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1300 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects can likewise be embodied as a means-plus-function claim, or in other forms, such as being embodied in a computer-readable medium. (Any claim intended to be treated under 35 U.S.C. § 112, ¶6 begins with the words "means for".) Accordingly, the applicant reserves the right to add additional claims after filing the application to pursue such additional claim forms for other aspects of the disclosure.

What is claimed is:

1. A method of populating a new synchronization folder during an upgrade of a synchronization client of a cloud-based platform, comprising:
   receiving a command for upgrading the synchronization client on a client device to a new version, wherein the synchronization client updates a synchronization folder storing a local copy of items in a collaboration workspace stored on the client device and a remote copy of the items in the collaboration workspace stored on the cloud-based platform, wherein upgrading the synchronization client to the new version is distinct from causing the updates between the local copy of the item on the client device and the remote copy of the item on the cloud-based platform and wherein upgrading the synchronization client to the new version changes a location of the synchronization folder from a first location on the client device to a second location on the client device;
   backing up the items stored at the first location on the client device to an archive location on the client device;
   identifying a location of a parent folder for the items stored at the first location on the client device;
   modifying a path to the location of the parent folder, wherein the modifying maps the location of the parent folder from the archive location;
   in response to the command for upgrading the version of the synchronization client, creating the new synchronization folder at the second location on the client device; and
   upon creation of the new synchronization folder, populating the new synchronization folder by:
      comparing states of items stored remotely under an account in a database of the cloud-based platform with states of the items stored at the archive location;
      identifying, based on the comparing of the states of items, items with matching states and one or more items with mismatched states; and
      transferring automatically the items with matching states from the archive location to the new synchronization folder, whereby the transferring automatically includes (i) the items with matching states to appear in the new synchronization folder and disappear from the archive location and (ii) the one or more items with mismatched states to remain stored in the archive location.

2. The method of claim 1, the populating further comprising:
   downloading the one or more items with mismatched states from the database of the cloud-based platform to populate the new synchronization folder.

3. The method of claim 2, wherein the one or more items with mismatched states includes (i) an item stored locally at the archive location having a state different from a state of the item stored remotely in the database of the cloud-based platform or (ii) an item stored remotely in the database of the cloud-based platform that does not have a corresponding item stored locally at the archive location.

4. The method of claim 1, wherein a state of each item is determined based on a hash of the item.

5. The method of claim 4, wherein a hash of an item stored locally at the archive location is obtained by calculation or from a cache of hashes.

6. The method of claim 4, wherein a hash of an item stored remotely in the database of the cloud-based platform is obtained from a remote file system shadow that provides a current state of all files and folders under the account stored in the database of the cloud-based platform.

7. The method of claim 5, wherein obtaining the hash of the item from the cache of the hashes includes:
   checking a file including one or more pre-calculated hashes, a filename, and timestamp data to lookup a pre-calculated hash of the item;
   determining that a timestamp for the pre-calculated hash is greater than a timestamp for the item stored locally at the archive location; and foregoing calculation of the hash of the item by using the pre-calculated hash for the comparing.

8. The method of claim 1, wherein populating the new synchronization folder with an item is in response to a create event for the item.

9. The method of claim 1, wherein the new synchronization folder is at a second location on the client device different from the first location and the archive location.

10. A non-transitory computer readable medium storing instructions configured to, when executed by a client computing device, cause the computing device to perform the method of populating a new synchronization folder during an upgrade of a synchronization client of a cloud-based platform, comprising instructions for:
receiving a command for upgrading the synchronization client on a client device to a new version, wherein the synchronization client updates a synchronization folder storing a local copy of items in a collaboration workspace stored on the client device and a remote copy of the items in the collaboration workspace stored on the cloud-based platform, wherein upgrading the synchronization client to the new version is distinct from causing the updates between the local copy of the item on the client device and the remote copy of the item on the cloud-based platform and wherein upgrading the synchronization client to the new version changes a location of the synchronization folder from a first location on the client device to a second location on the client device;
backing up the items stored at the first location on the client device to an archive location on the client device;
identifying a location of a parent folder for the items stored at the first location on the client device;
modifying a path to the location of the parent folder, wherein the modifying maps the location of the parent folder from the archive location;
in response to the command for upgrading the synchronization client, creating the new synchronization folder at the second location on the client device; and
upon creation of the new synchronization folder, populating the new synchronization folder by:
comparing states of items stored remotely under an account in a database of the cloud-based platform with states of the items stored;
identifying, based on the comparing of the states of items, items with matching states and one or more items with mismatched states; and
transferring automatically the items with matching states from the archive location to the new synchronization folder, whereby the transferring automatically includes (i) the items with matching states to appear in the new synchronization folder and disappear from the archive location and (ii) the one or more items with mismatched states to remain stored in the archive location.

11. The medium of claim 10, wherein the instructions further comprise instructions for:
downloading the one or items with mismatched states from the database of the cloud-based platform to populate the new synchronization folder.

12. The medium of claim 11, wherein the one or more items with mismatched item includes (i) an item stored locally at the archive location having a state different from a state of the item stored remotely in the database of the cloud-based platform or (ii) an item stored remotely in the database of the cloud-based platform that does not have a corresponding item stored locally at the archive location.

13. The medium of claim 10, wherein a state of each item is determined based on a hash of the item.

14. The medium of claim 13, wherein a hash of an item stored locally at the archive location is obtained by calculation or from a cache of hashes.

15. The medium of claim 13, wherein a hash of an item stored remotely in the database of the cloud-based platform is obtained from a remote file system shadow that provides a current state of all files and folders under the account stored in the database of the cloud-based platform.

16. The medium of claim 14, wherein instructions for obtaining the hash of the item from the cache of the hashes includes instructions for:
checking a file including one or more pre-calculated hashes, a filename, and timestamp data to lookup a pre-calculated hash of the item;
determining that a timestamp for the pre-calculated hash is greater than a timestamp for the item stored locally at the archive location; and
foregoing calculation of the hash of the item by using the pre-calculated hash for the comparing.

17. The medium of claim 10, wherein populating the new synchronization folder with an item is in response to a create event for the item.

18. The medium of claim 10, wherein the new synchronization folder is at a second location on the client device different from the first location and the archive location.

19. A system comprising:
a processor; and
a memory coupled with and readable by the processor and having stored therein a set of instructions which, when executed by the processor, causes the processor to populate a new synchronization folder during an upgrade of a synchronization client of a cloud-based platform by:
receiving a command for upgrading the synchronization client on a client device to a new version, wherein the synchronization client updates a synchronization folder storing a local copy of items in a collaboration workspace stored on the client device and a remote copy of the items in the collaboration workspace stored on the cloud-based platform, wherein upgrading the synchronization client to the new version is distinct from causing the updates between the local copy of the item on the client device and the remote copy of the item on the cloud-based platform and wherein upgrading the synchronization client to the new version changes a location of the synchronization folder from a first location on the client device to a second location on the client device;
backing up the items stored at the first location on the client device to an archive location on the client device;
identifying a location of a parent folder for the items stored at the first location on the client device;
modifying a path to the location of the parent folder, wherein the modifying maps the location of the parent folder from the archive location;
in response to the command for upgrading the version of the synchronization client, creating the new synchronization folder at the second location on the client device; and
upon creation of the new synchronization folder, populating the new synchronization folder by:

comparing states of items stored remotely under an account in a database of the cloud-based platform with states of the items stored at the archive location;

identifying, based on the comparing of the states of items, items with matching states and one or more items with mismatched states; and transferring automatically the items with matching states from the archive location to the new synchronization folder, whereby the transferring automatically includes (i) the items with matching states to appear in the new synchronization folder and disappear from the archive location and (ii) the one or more items with mismatched states to remain stored in the archive location.

20. The system of claim 19, the populating further comprising:

downloading the one or more items with mismatched states from the database of the cloud-based platform to populate the new synchronization folder.

21. The system of claim 20, wherein the one or more items with mismatched states includes (i) an item stored locally at the archive location having a state different from a state of the item stored remotely in the database of the cloud-based platform or (ii) an item stored remotely in the database of the cloud-based platform that does not have a corresponding item stored locally at the archive location.

22. The system of claim 19, wherein a state of each item is determined based on a hash of the item.

23. The system of claim 22, wherein a hash of an item stored locally at the archive location is obtained by calculation or from a cache of hashes.

24. The system of claim 22, wherein a hash of an item stored remotely in the database of the cloud-based platform is obtained from a remote file system shadow that provides a current state of all files and folders under the account stored in the database of the cloud-based platform.

25. The system of claim 23, wherein obtaining the hash of the item from the cache of the hashes includes:

checking a file including one or more pre-calculated hashes, a filename, and timestamp data to lookup a pre-calculated hash of the item;

determining that a timestamp for the pre-calculated hash is greater than a timestamp for the item stored locally at the archive location; and foregoing calculation of the hash of the item by using the pre-calculated hash for the comparing.

26. The system of claim 19, wherein populating the new synchronization folder with an item is in response to a create event for the item.

27. The system of claim 19, wherein the new synchronization folder is at a second location on the client device different from the first location and the archive location.

* * * * *